(12) United States Patent
Iba et al.

(10) Patent No.: US 11,630,305 B2
(45) Date of Patent: *Apr. 18, 2023

(54) ATTACHABLE IMAGE DISPLAY DEVICE AND OCULAR OPTICAL SYSTEM

(71) Applicant: KOPIN CORPORATION, Westborough, MA (US)

(72) Inventors: Yoichi Iba, Tokyo (JP); Hideki Tomine, Tokyo (JP)

(73) Assignee: KOPIN CORPORATION, Westborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/376,616

(22) Filed: Dec. 12, 2016

(65) Prior Publication Data

US 2017/0176754 A1    Jun. 22, 2017

(30) Foreign Application Priority Data

Dec. 17, 2015  (JP) .............................. JP2015-246078

(51) Int. Cl.
G02B 27/14    (2006.01)
G02B 27/01    (2006.01)
G02B 27/00    (2006.01)
G02B 27/12    (2006.01)

(52) U.S. Cl.
CPC ..... G02B 27/0172 (2013.01); G02B 27/0018 (2013.01); G02B 27/0176 (2013.01);
(Continued)

(58) Field of Classification Search
CPC ............ G02B 27/0172; G02B 27/0018; G02B 27/0176; G02B 27/126; G02B 2027/0178; G02B 2027/015

See application file for complete search history.

(56) References Cited

U.S. PATENT DOCUMENTS

2002/0101643 A1    8/2002  Kobayashi
2007/0058261 A1    3/2007  Sugihara et al.
(Continued)

FOREIGN PATENT DOCUMENTS

CN    102692707    9/2012
CN    103293674    9/2013
(Continued)

OTHER PUBLICATIONS

Notice of Allowance Issued in U.S. Appl. No. 15/385,861 Now U.S. Pat. 10,001,650.

(Continued)

*Primary Examiner* — Alicia M Harrington
(74) *Attorney, Agent, or Firm* — Peloquin, PLLC; Mark S. Peloquin, Esq.

(57) ABSTRACT

An ocular optical system includes a light guiding prism that guides image light from a display element and an emission portion that emits the image light guided by the light guiding prism. The light guiding prism includes a plurality of sides arranged to surround a light path of the image light, and a reflection surface off which the image light is reflected to the emission portion. The plurality of sides include a first side that is arranged on an opposite side of a first plane including first and second optical axes and that is situated between the emission portion and the reflection surface, wherein the first optical axis is a portion of the image light before the image light is reflected off the reflection surface, and the second optical axis is a portion of the image light after the image light is reflected off the reflection surface.

8 Claims, 35 Drawing Sheets

(52) U.S. Cl.
CPC ...... *G02B 27/126* (2013.01); *G02B 2027/015* (2013.01); *G02B 2027/0121* (2013.01); *G02B 2027/0178* (2013.01)

(56) References Cited

U.S. PATENT DOCUMENTS

| | | | |
|---|---|---|---|
| 2010/0245211 A1* | 9/2010 | Iba | G02B 17/006 345/8 |
| 2012/0242561 A1* | 9/2012 | Sugihara | G02B 27/0172 345/8 |
| 2013/0134301 A1 | 5/2013 | Takahashi | |
| 2014/0225813 A1 | 8/2014 | Komatsu | |
| 2015/0260988 A1* | 9/2015 | Sugihara | G02B 27/0172 359/630 |

FOREIGN PATENT DOCUMENTS

| | | |
|---|---|---|
| JP | 2002-196277 A | 7/2002 |
| JP | 2005-316087 A | 11/2005 |
| JP | 2006-003879 A | 1/2006 |
| JP | 2010-224473 A | 10/2010 |
| JP | 2012-027350 A | 2/2012 |
| JP | 2013-200553 A | 10/2013 |
| JP | 2014-153644 A | 8/2014 |
| JP | 2015-087742 A | 5/2015 |
| JP | 2015-135506 A | 7/2015 |
| JP | 2015179200 A * | 10/2015 |
| WO | WO2015/063809 | 5/2015 |
| WO | WO2015/114691 | 8/2015 |
| WO | WO2016/185535 | 11/2016 |

OTHER PUBLICATIONS

Office Action Issued in Corresponding JP Patent Application No. 2015-246078.

Office Action Issued in Corresponding CN Patent Application No. CN201611143642.2 dated Apr. 24, 2020.

* cited by examiner

PRIOR ART

ATTACHABLE IMAGE DISPLAY DEVICE AND OCULAR OPTICAL SYSTEM

CROSS-REFERENCE TO RELATED APPLICATIONS

This application is based upon and claims the benefit of priority of the prior Japanese Patent Application No. 2015-246078, filed on Dec. 17, 2015, the entire contents of which are incorporated herein by reference.

BACKGROUND OF THE INVENTION

1. Field

The present disclosure relates to an attachable image display device that includes a light guiding prism, and an ocular optical system that includes a light guiding prism.

2. Background

Attachable image display devices used worn on the head of a human have attracted attention in recent years. As an example, an image display device in the form of glasses is known (see, for example, Japanese Laid-open Patent Publication No. 2015-135506).

An attachable image display device includes, for example, a display element and an ocular optical system including a light guide prism, and it guides image light from the display element and emits the image light to an eye of a user, so as to display a display image of the display element in the field of view of the user.

The light guiding prism serves to guide, to the front of the eye of the user, image light from the display element, so it is configured to be small and thin in order to not interrupt the field of view of the user significantly.

However, if the light guide prism is made small and thin, light reflected off a side of the light guiding prism within the light guiding prism may enter a pupil of the user so as to generate a ghost image in the field of view of the user, for example, as illustrated in FIG. 4 described later.

FIG. 1 is a perspective view of examples of a display element and an ocular optical system that are included in a conventional attachable image display device. FIG. 2 is a perspective view of the ocular optical system as viewed from a different direction than that of FIG. 1. FIG. 3 is a plan view of the display element and the ocular optical system. FIG. 4 is a diagram that illustrates an example of a beam that is emitted from the center of a display area of the display element and passes through cross sections of the ocular optical system.

In FIGS. 1 to 3, an ocular optical system 1 includes a light guiding prism 3 that guides image light from a display element 2, and an emission portion 4 that emits the image light guided by the light guiding prism 3 to an eye of a user.

The light guiding prism 3 includes four sides 3a, 3b, 3c, and 3d that are arranged to surround a light path of the image light from the display element 2, and a reflection surface 3e off which the image light from the display element 2 is reflected to the emission portion 4.

The emission portion 4 includes an emission surface 4a that has a positive refractive power, and the emission surface 4a emits the image light reflected off the reflection surface 3e.

An optical axis 5 (5a and 5b) is a beam emitted from the center of a display area of the display element 2 to pass through the center of the emission surface 4a of the emission portion 4 without being reflected off any surface other than the reflection surface 3e. It is assumed that, in the beam, a portion of the beam before the beam is reflected off the reflection surface 3e is the optical axis 5a and a portion of the beam after the beam is reflected off the reflection surface 3e is the optical axis 5b.

The sides 3a and 3b of the light guiding prism 3 are surfaces arranged parallel to a plane including the optical axes 5a and 5b. The sides 3c and 3d of the light guiding prism 3 are surfaces that are arranged parallel to a plane that includes the optical axis 5a and that is perpendicular to the plane including the optical axes 5a and 5b.

A cross section 3f of the light guiding prism 3 is a cross section corresponding to the plane that includes the optical axis 5a and that is perpendicular to the plane including the optical axes 5a and 5b. A cross section 3g of the light guiding prism 3 is a cross section corresponding to a plane that is perpendicular to the optical axis 5a and that is situated closer to the display element 2 than the emission portion 4. A cross section 3h of the light guiding prism 3 and a cross section 4b of the emission portion 4 are cross sections corresponding to a plane that includes the optical axis 5b and that is perpendicular to the plane including the optical axes 5a and 5b. The cross sections 3f, 3g and 3h each have a rectangular or square shape. The cross sections 3f, 3g, 16h, and 4b are also cross sections of the ocular optical system 1.

For example, as illustrated in FIG. 4, when a beam is emitted from the center of the display area of the display element 2 and passes through each of the cross sections 3f, 3h, and 4b of the ocular optical system 1, the ocular optical system 1 having the configuration described above may cause the beam reflected off the side 3a (or the side 3b) of the light guiding prism 3 to enter a pupil of the user (a pupil of an eye 6). In this case, a ghost image is generated in the field of view of the user due to the beam. In particular, an area situated between the reflection surface 3e and the emission portion 4 at the side 3a (or the side 3b) of the light guiding prism 3 is close to the emission portion 4, so light reflected off the area will generate a stronger ghost image.

Such a ghost image is generated more easily due to the light guiding prism 3 being made smaller and thinner.

Thus, in an attachable image display device that includes an ocular optical system including a small and thin light guiding prism, a ghost image generated doe to light reflected off a side of the light guiding prism is desired to be removed or reduced

SUMMARY

An aspect of the present disclosure provides an attachable image display device that includes a display element and an ocular optical system. The ocular optical system includes a light guiding prism that guides image light from the display element, and an emission portion that emits the image light guided by the light guiding prism. The light guiding prism includes a plurality of sides arranged to surround a light path of the image light, and a reflection surface off which the image light is reflected to the emission portion. The emission portion includes an emission surface that has a positive refractive power, and the emission surface emits the image light reflected off the reflection surface. The plurality of sides include a first side that is arranged on an opposite side of a first plane including first and second optical axes and that is situated between the emission portion and the reflection surface, wherein the first optical axis is a portion of the image light before the image light is reflected off the reflection surface, and the second optical axis is a portion of the image light after the image light is reflected off the reflection surface. A portion of or the entirety of an intersection line of the first side and a plane that includes the first optical axis and that is perpendicular to the first plane has a negative inclination angle to the first optical axis in a direction downstream of the light path, and a portion of or the entirety of an intersection of the first side and a plane that includes the second optical axis and that is perpendicular to the first plane has a positive inclination angle to the second optical axis in the direction downstream of the light path.

Another aspect of the present disclosure provides an ocular optical system that includes a light guiding prism that guides image light from a display element and an emission portion that emits the image light guided by the light guiding prism. The light guiding prism includes a plurality of sides arranged to surround a light path of the image light, and a reflection surface off which the image light is reflected to the emission portion. The emission portion includes an emission surface that has a positive refractive power, and the emission surface emits the image light reflected off the reflection surface. The plurality of sides include a first side that is arranged on an opposite side of a first plane including first and second optical axes and that is situated between the emission portion and the reflection surface, wherein the first optical axis is a portion of the image light before the image light is reflected off the reflection surface, and the second optical axis is a portion of the image light after the image light is reflected off the reflection surface. A portion of or the entirety of an intersection line of the first side and a plane that includes the first optical axis and that is perpendicular to the first plane has a negative inclination angle to the first optical axis in a direction downstream of the light path, and a portion of or the entirety of an intersection of the first side and a plane that includes the second optical axis and that is perpendicular to the first plane has a positive inclination angle to the second optical axis in the direction downstream of the light path.

DESCRIPTION OF EMBODIMENTS

In the following detailed description of embodiments of the invention, reference is made to the accompanying drawings in which like references indicate similar elements, and in which is shown by way of illustration, specific embodiments in which the invention may be practiced. These embodiments are described in sufficient detail to enable those of skill in the art to practice the invention. In other instances, well-known circuits, structures, and techniques have not been shown in detail in order not to obscure the understanding of this description. The following detailed description is, therefore, not to be taken in a limiting sense, and the scope of the invention is defined only by the appended claims.

<First Embodiment>

Figure 1:
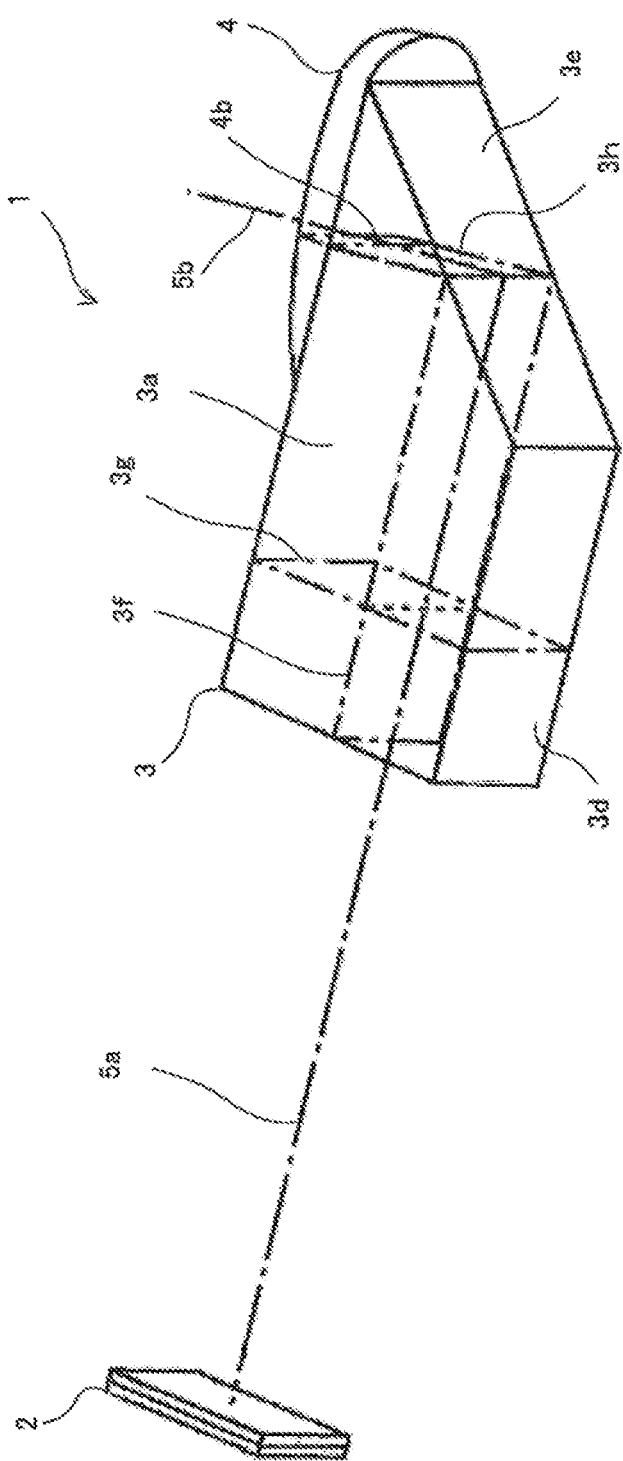
FIG. 1 is a perspective view of examples of a display element and an ocular optical system that are included in a conventional attachable image display device.
Figure 2:
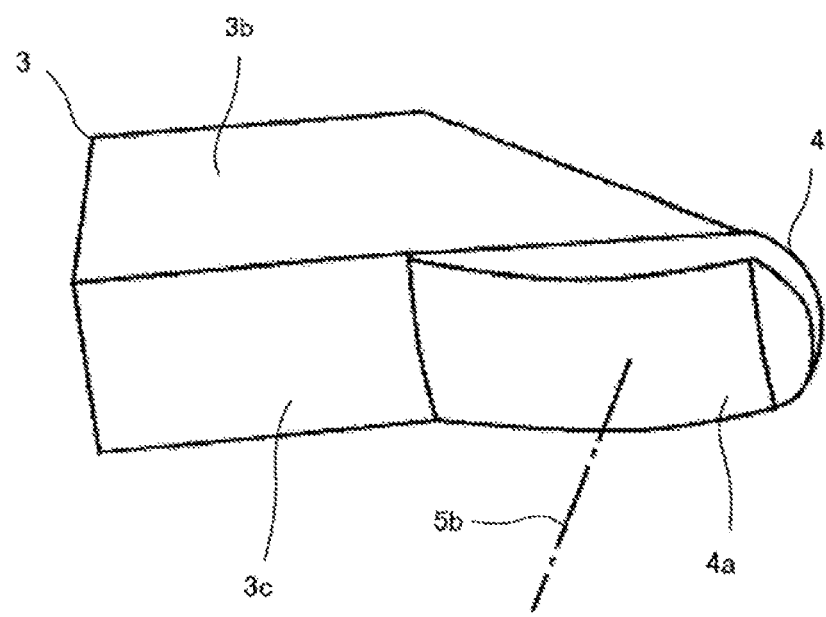
FIG. 2 is a perspective view of the ocular optical system as viewed from a different direction than that of FIG. 1.
Figure 3:
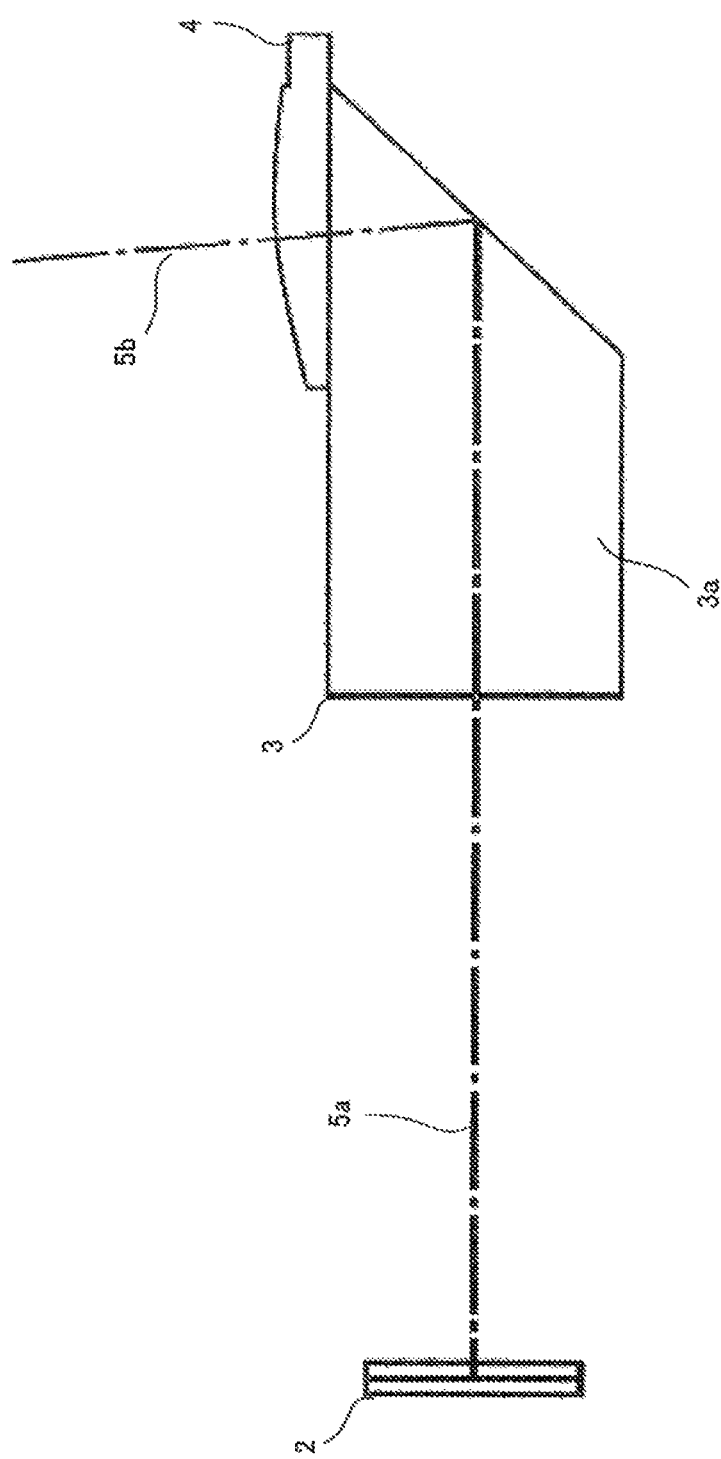
FIG. 3 is a plan view of the display element and the ocular optical system.
Figure 4:
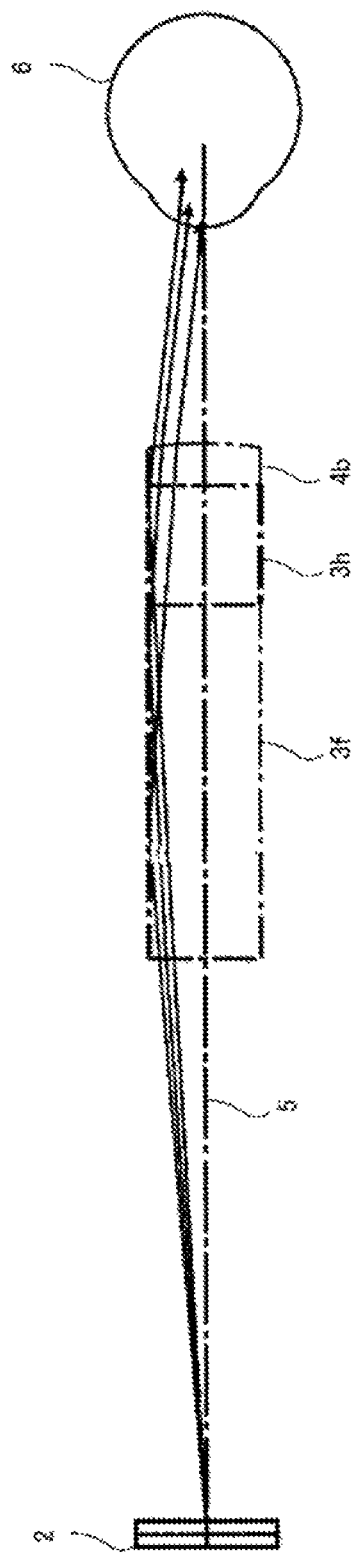
FIG. 4 is a diagram that illustrates an example of a beam that is emitted from the center of a display area of the display element and passes through cross sections of the ocular optical system.
Figure 5:
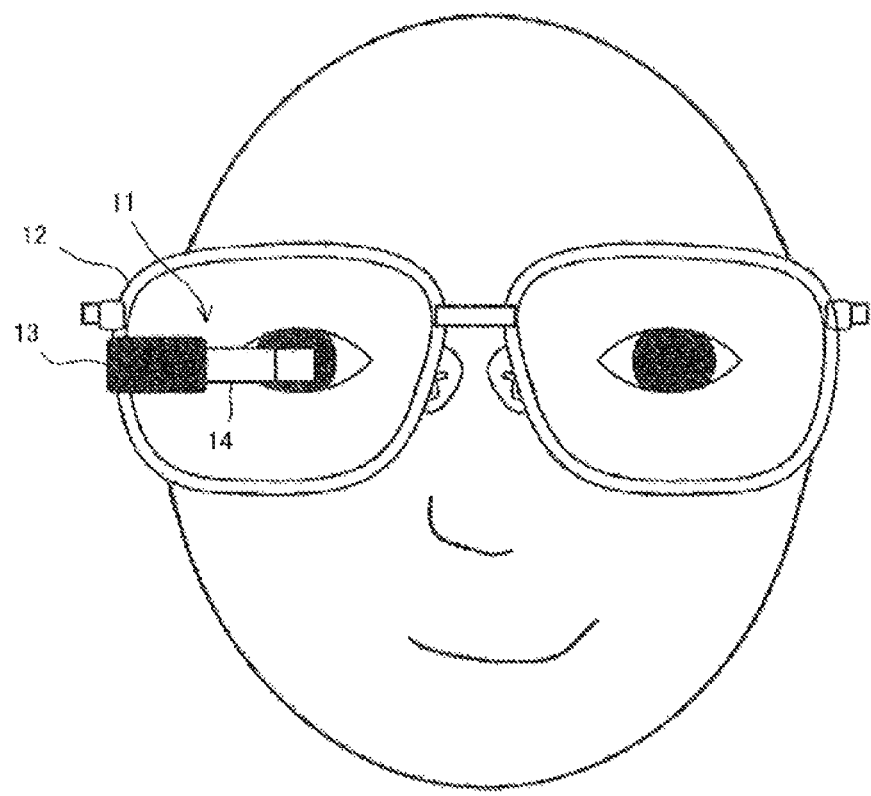
FIG. 5 illustrates an example of an attachment of an attachable image display device according to a first embodiment.

FIG. 5 illustrates an example of an attachment of an attachable image display device according to a first embodiment.

As illustrated in FIG. 5, an attachable image display device 11 according to the present embodiment is fixed on a rim of glasses 12, and is worn on the head of a user when the user wears the glasses 12. The attachable image display device 11 includes a housing 13 fixed on the rim of the glasses 12, a display element (not illustrated) arranged in the housing 13, and an ocular optical system 14 held by the housing 13.

Figure 6:
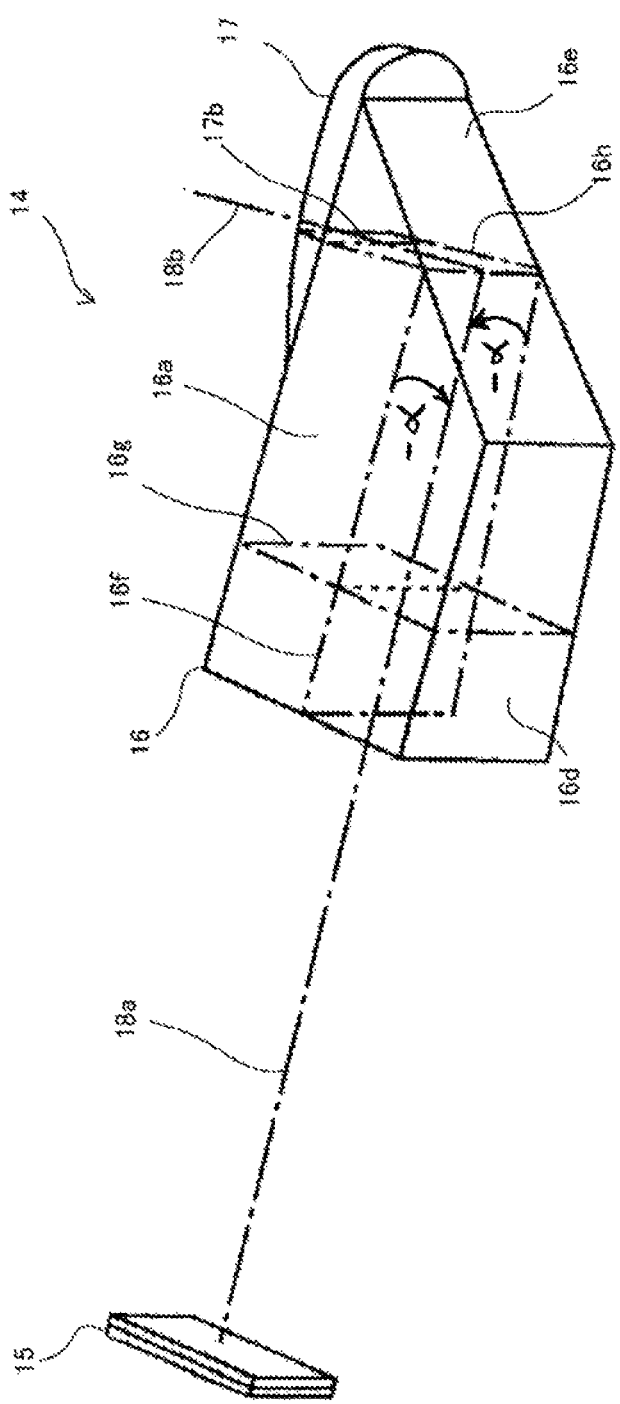
FIG. 6 is a perspective view of examples of a display element and an ocular optical system that are included in the attachable image display device according to the first embodiment.
Figure 7:
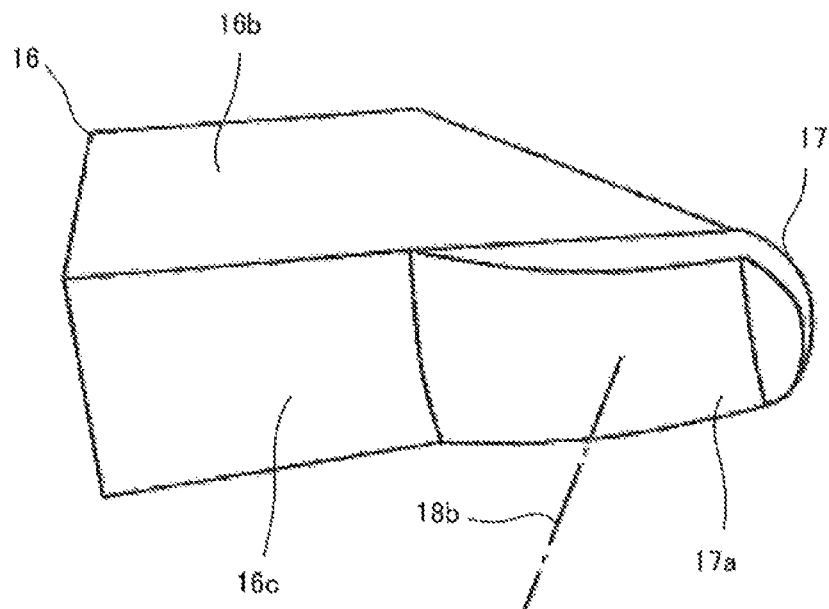
FIG. 7 is a perspective view of the ocular optical system according to the first embodiment, as viewed from a different direction than that of FIG.
Figure 8:
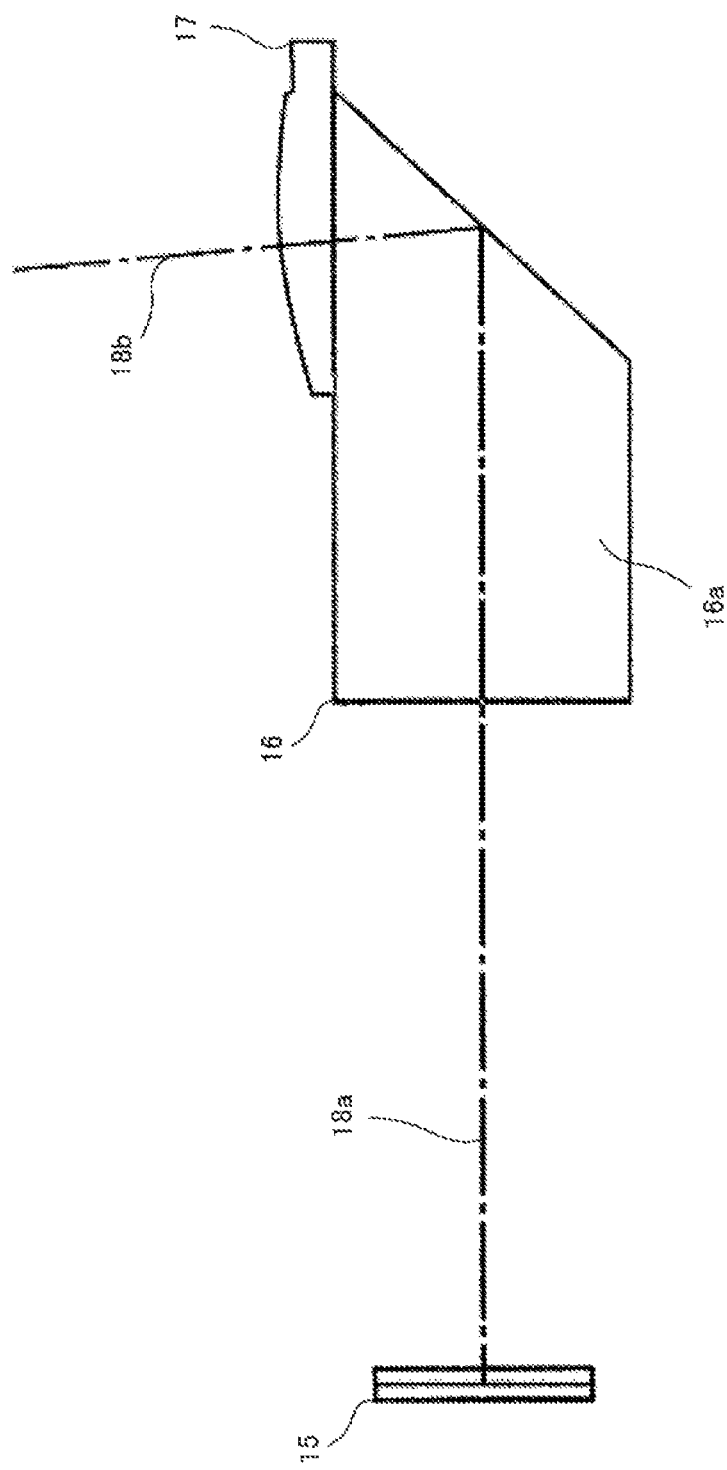
FIG. 8 is a plan view of the display element and the ocular optical system according to the first embodiment.
Figure 9:
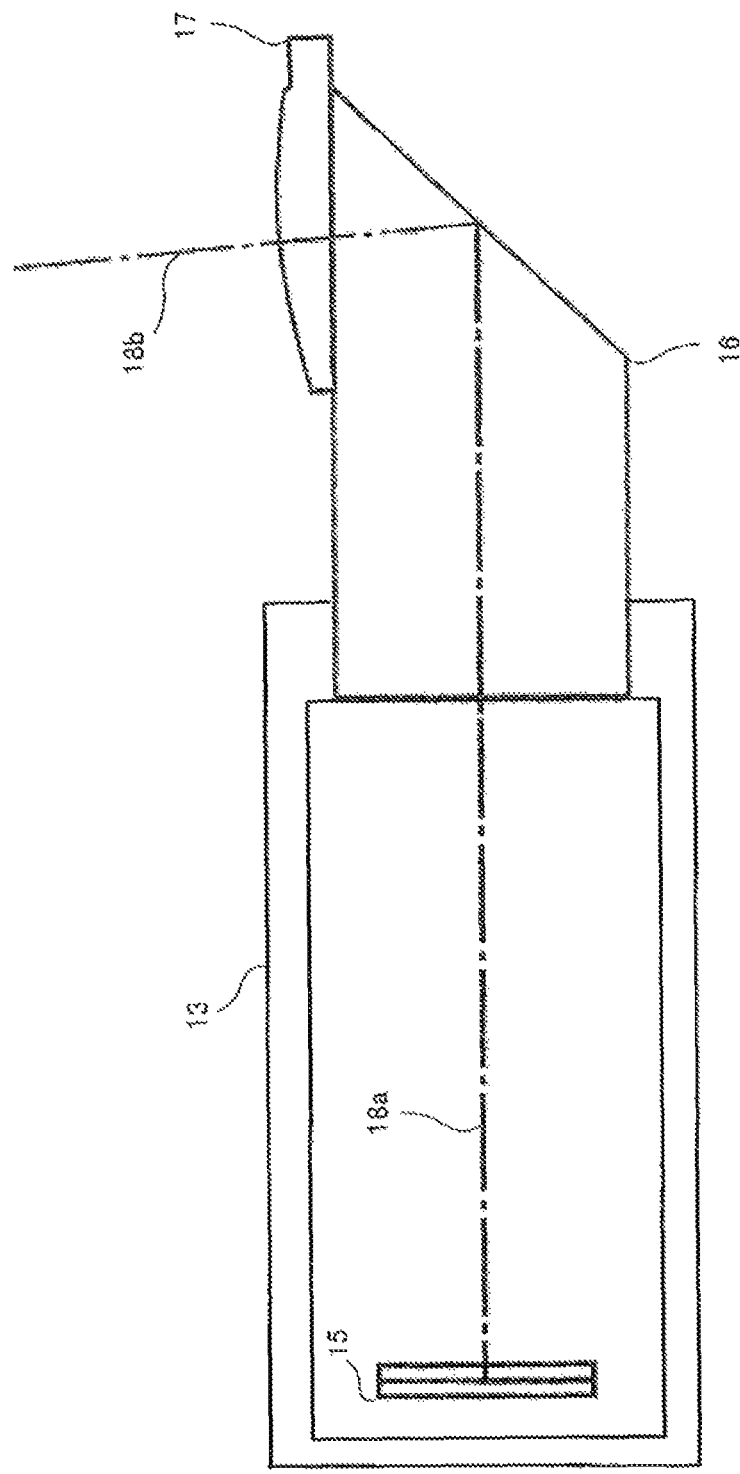
FIG. 9 is a cress-sectional view of a housing, the display element, and the ocular optical system that are included in the attachable image display device according to the first embodiment.
Figure 10:
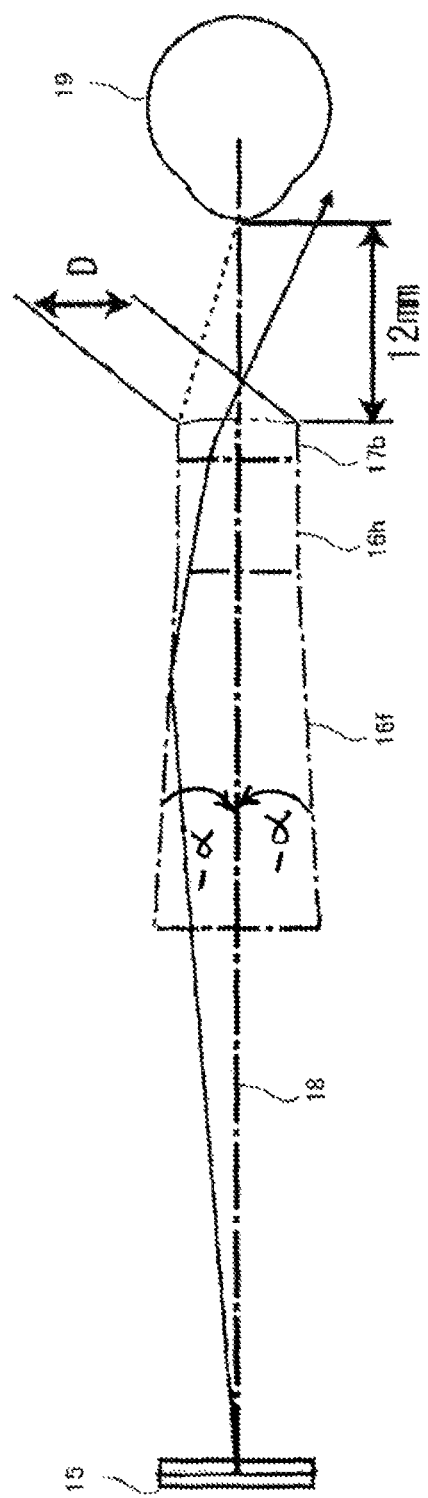
FIG. 10 is a diagram that illustrates an example of a beam that is emitted from the center of a display area of the display element and passes through cross sections of the ocular optical system, according to the first embodiment.
Figure 11:
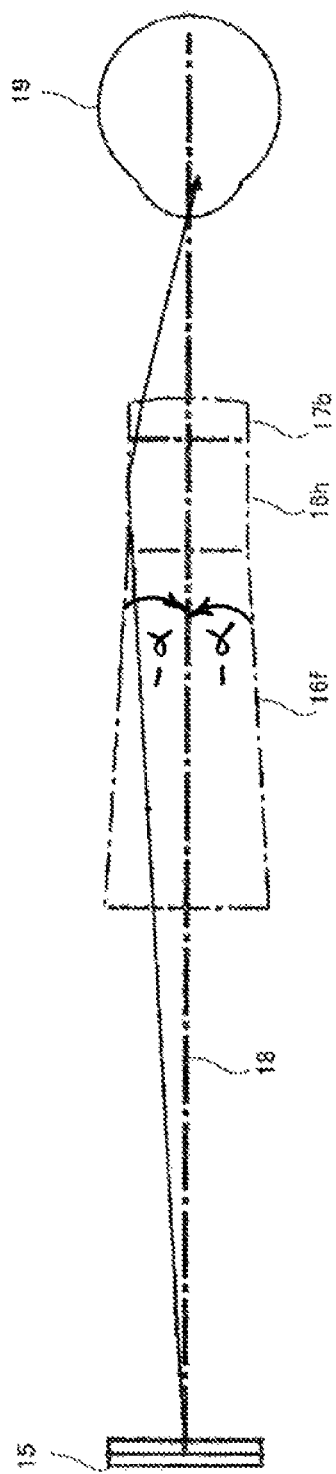
FIG. 11 is a diagram that illustrates another example of the beam that is emitted from the center of the display area of the display element and passes through the cross sections of the ocular optical system, according to the first embodiment.

FIG. 6 is a perspective view of examples of the display element and the ocular optical system 14 that are included in the attachable image display device 11. FIG. 7 is a perspective view of the ocular optical system 14 as viewed from a different direction than that of FIG. 6. FIG. 8 is a plan view of the display element and the ocular optical system 14. FIG. 9 is a cross-sectional view of the housing 13, the display element, and the ocular optical system 14 that are included in the attachable image display device 11. FIGS. 10 and 11 are diagrams that illustrate examples of a beam that is emitted from the center of a display area of the display element and passes through cross sections of the ocular optical system 14.

In FIGS. 6 to 9, the ocular optical system 14 includes a light guiding prism 16 that guides image light from a display element 15, and an emission portion 17 that emits the image light guided by the light guiding prism 16 to an eye of the user.

The light guiding prism 16 includes four sides 16a, 16b, 16c, and 16d that are arranged to surround a light path of the image light from the display element 15, and a reflection surface 16e off which the image light from the display element 15 is reflected to the emission portion 17.

The emission portion 17 includes an emission surface 17a that has a positive refractive power, and the emission surface 17a emits the image light reflected off the reflection surface 16e.

An optical axis 18 (18a and 18b) is a beam emitted from the center of the display area of the display element 15 to pass through the center of the emission surface 17a of the emission portion 17 without being reflected off any surface other than the reflection surface 16e. It is assumed that, in the beam, a portion of the beam before the beam is reflected off the reflection surface 16e is the optical axis 18a and a portion of the beam after the beam is reflected off the reflection surface 16e is the optical axis 18b. Further, it is assumed that the direction in which the portion of the beam before the beam is reflected off the reflection surface 16e travels is a positive direction of the optical axis 18a and the direction in which the portion of the beam after the beam is reflected off the reflection surface 16e travels is a positive direction of the optical axis 18b.

The sides 16a and 16b of the light guiding prism 16 are surfaces arranged on opposite sides of a plane including the optical axes 18a and 18b, and have, in the positive direction of the optical axis 18a, negative inclination angles (−α) to the plane including the optical axes 18a and 18b, Here, an absolute value of the negative inclination angle is a value greater than D(48n) radians. D is an opening size of the emission surface 17a of the emission portion 17 in a vertical direction with respect to the plane .including the optical axes 18a and 18b (see FIG. 10 described later), and n is a refractive index of the light guiding prism 16.

The sides 16c and 16d of the light guiding prism 16 are surfaces that are arranged parallel to a plane that includes the optical axis 18a and that is perpendicular to the plane including the optical axes 18a and 18b. At least portions of the sides 16c and 16d that are exposed from the housing 13 are polished, which makes it possible to view the outside world from the user's eye through the sides 16c and 16d.

A cross section 16f of the light guiding prism 16 is a cross section corresponding to the plane that includes an optical axis 18a and that is perpendicular to the plane including the optical axes 18a and 18b. A cross section 16g of the light guiding prism 16 is a cross section corresponding to a plane that is perpendicular to the optical axis 18a and that is situated closer to the display element 15 than the emission portion 17. A cross section 16h of the light guiding prism 16 and a cross section 17b of the emission portion 17 are cross sections corresponding to a plane that includes the optical axis 18b and that is perpendicular to the plane including the optical axes 18a and 18b. The cross section 16f has a trapezoidal shape, and the cross sections 16g and 16h each have a rectangular or square shape. The cross sections 16f, 16g, 16h, and 17b are also cross sections of the ocular optical system 14.

In the light guiding prism 16 having the configuration described above, an intersection line of the side 16a and the cross section 16f and an intersection line of the side 16b and the cross section 16f each have a negative inclination angle to the optical axis 18a in the positive direction of the optical axis 18a.

For example, as illustrated in FIG. 10, when a beam is emitted from the center of the display area of the display element 15 and passes through each of the cross sections 16f, 16h, and 17b of the ocular optical system 14, the ocular optical system 14 having the configuration described above makes it possible to divert, from a pupil of the user (a pupil of an eye 19), the beam reflected off the side 16a (or the side 16b) before it is reflected off the reflection surface 16e. The reason for this is as follows.

When light passes though the center of the pupil of the eye 19, an angle θe (the unit is radians) at which upper and lower edges of the emission portion 17 (one end and the other end in an intersection line of the cross section 17b and the emission surface 17a) are visible from the eye 19 of the user is obtained by θe=±(D/2)/(eye relief).

D is the above-described opening size of the emission surface 17a of the emission portion 17. The eye relief is a distance between the emission portion 17 and the eye 19 in a direction of the optical axis 18b. It is known that the eye relief is approximately 12 mm in, for example, the eyewear field.

Thus, when the eye relief is, for example, 12 mm, θe=±D/24.

In the light guiding prism 16, for example, when a beam emitted from the center of the display area of the display element 15 is reflected off the side 16a, which has the above-described negative inclination angle (−α) (the absolute value of the inclination angle is greater than D/(48n)), the inclination of the beam is greater than D/(48n)×2=D/(24n). Then, when the beam having this inclination passes through the light guiding prism 16, the beam will have an inclination greater than D/(24n)×n=D/24 even without considering a positive refractive power of the emission portion 17. If the positive refractive power of the emission portion 17 is considered, it will have a further greater inclination. In other words, the beam will definitely be diverted from the center of the pupil of the user because it has an inclination greater than the θe described above when it passes through the emission portion 17.

Therefore, a ghost image is not formed or is less noticeable in the field of view of the user.

In other words, it is possible to prevent a ghost image from occurring due to a beam reflected off the side 16a (or the side 16b) before it is reflected off the reflection surface 16e.

According to this ocular optical system 14, as illustrated in FIG. 11, a beam reflected off the side 16a (or the side 16b) after it is reflected off the reflection surface 16e may enter the pupil of the user (the pupil of the eye 19) so as to form a ghost image. A ghost image formed due to such a beam can be prevented by the aspects in the embodiments described after this.

<Second Embodiment>

The attachable image display device according to a second embodiment includes the light guiding prism 16 of the attachable image display device 11 according to the first embodiment, in which the inclination directions of the sides 16a and 16b have been changed.

In order to facilitate understanding, like reference numbers used in the first embodiment are used to describe the second embodiment.

Figure 12:
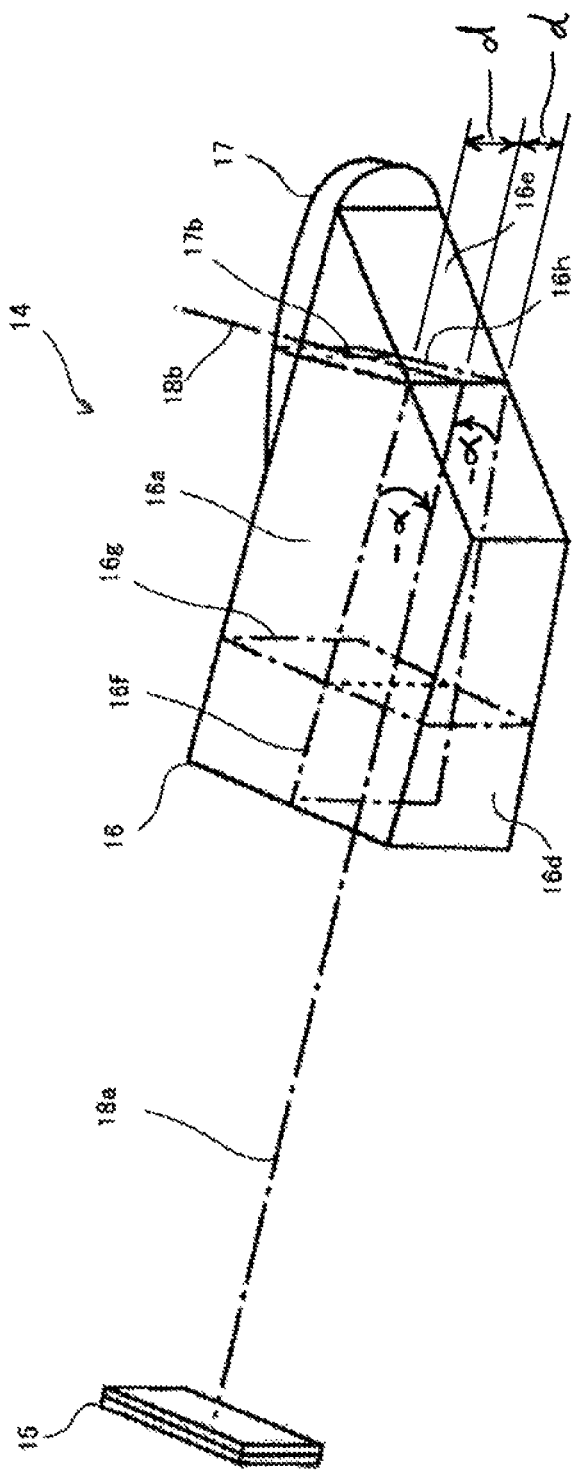
FIG. 12 is a perspective view of examples of the display element and the ocular optical system that are included in the attachable image display device according to the second embodiment.
Figure 13:
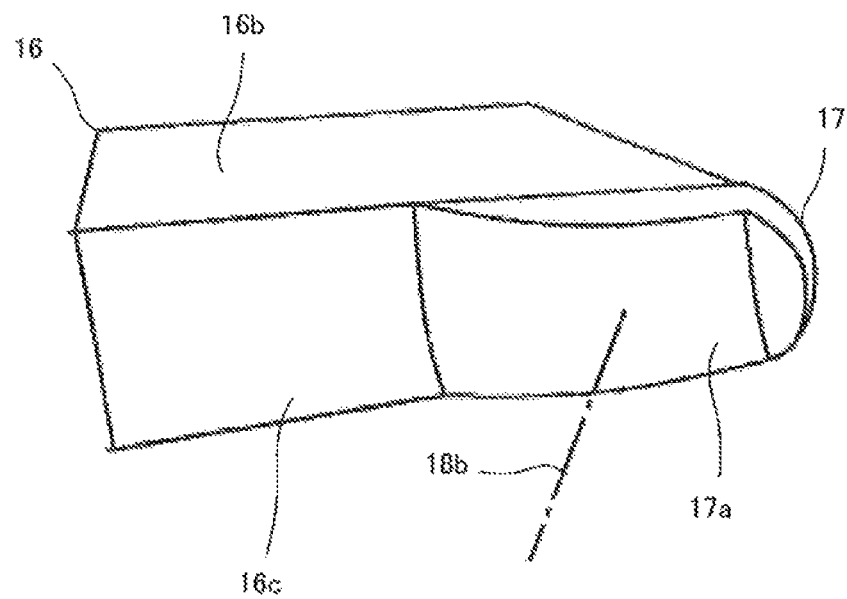
FIG. 13 is a perspective view of the ocular optical system according to the second embodiment, as viewed from a different direction than that of FIG. 12.
Figure 14:
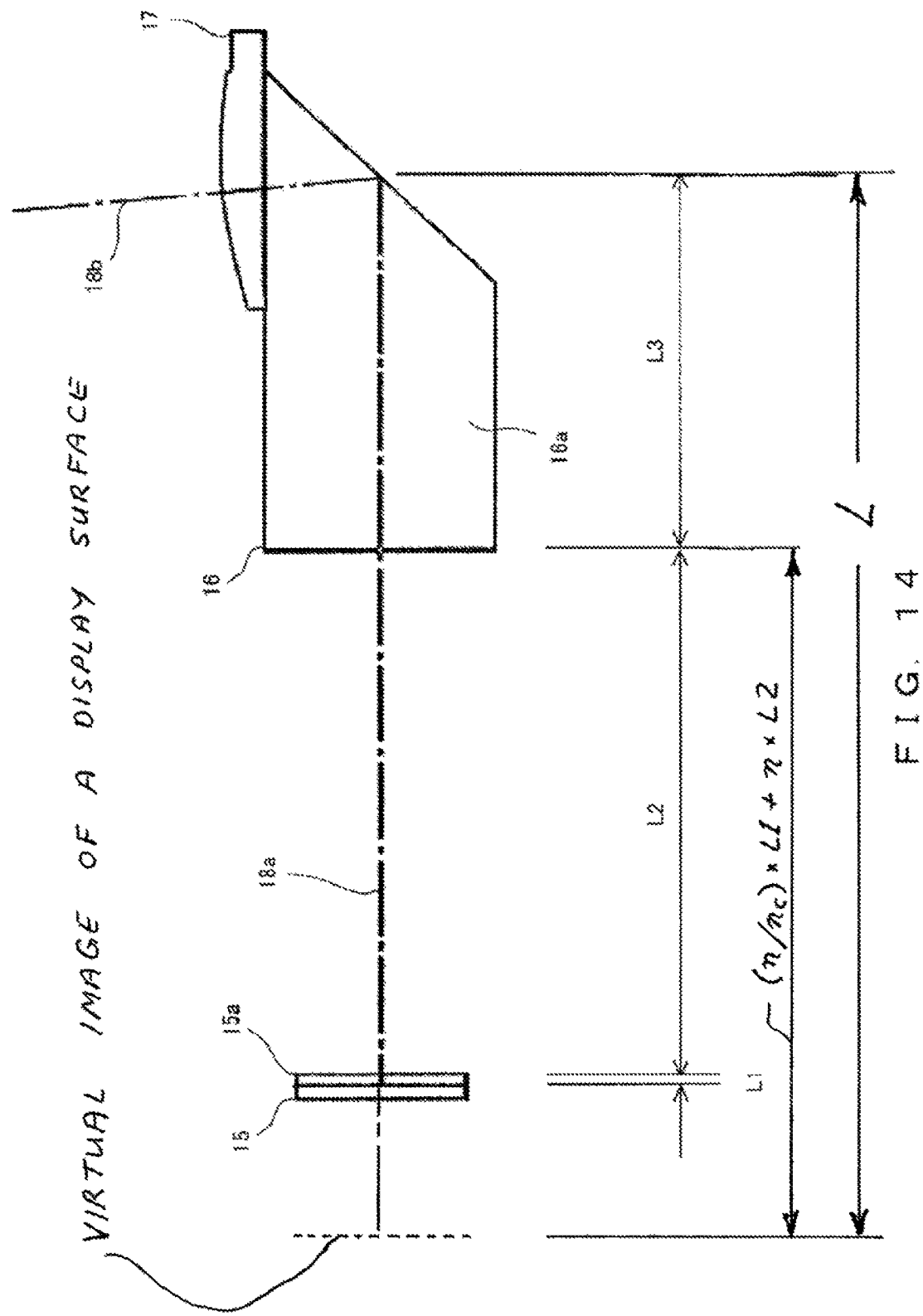
FIG. 14 is a plan view of the display element and the ocular optical system according to the second embodiment.
Figure 15:
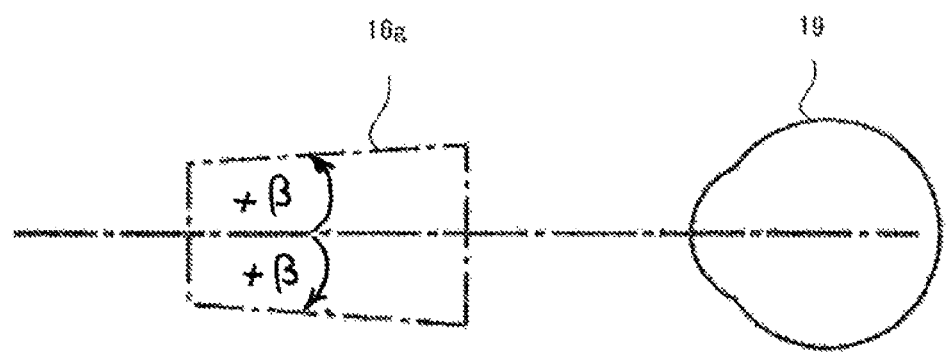
FIG. 15 illustrates a shape of a cross section of a light guiding prism according to the second embodiment.
Figure 16:
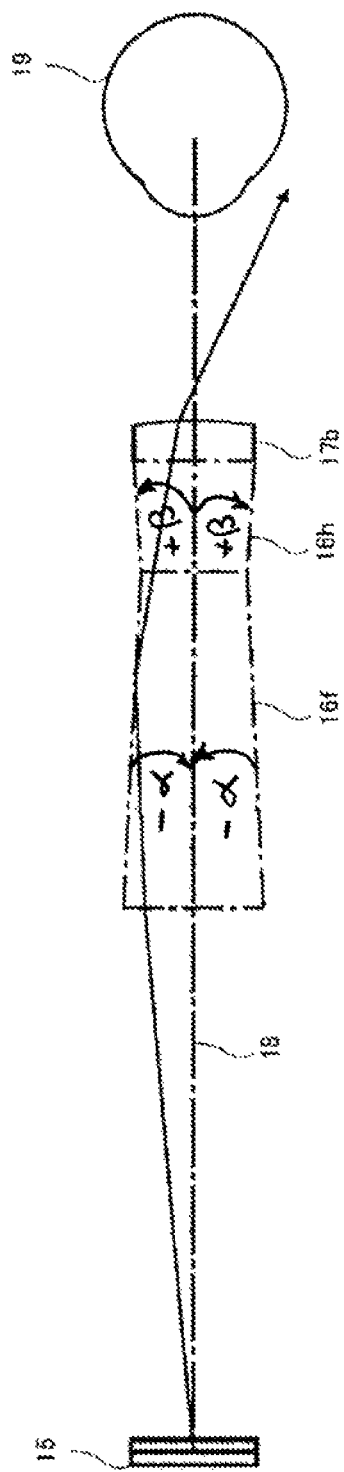
FIG. 16 is a diagram that illustrates an example of a beam that is emitted from the center of the display area of the display element and passes through the cross sections of the ocular optical system, according to the second embodiment.
Figure 17:
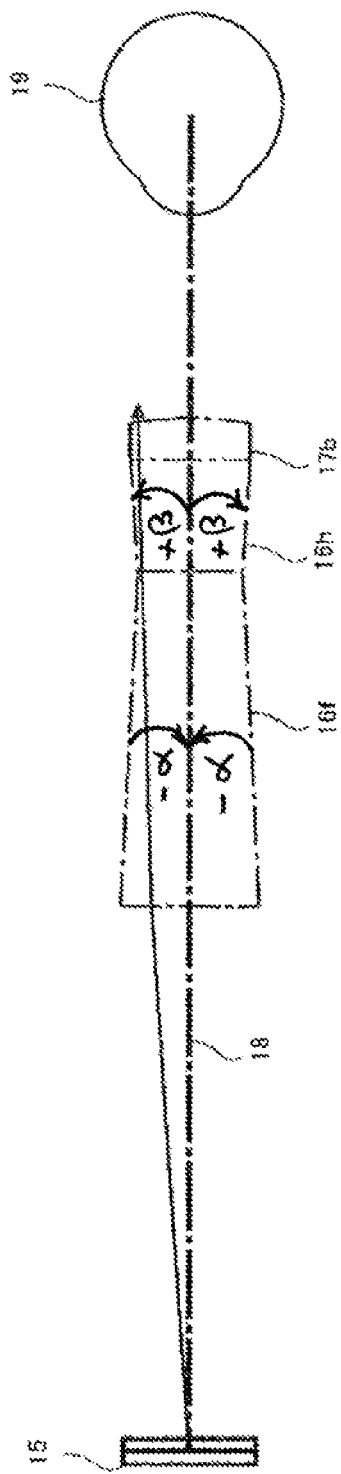
FIG. 17 is a diagram that illustrates another example of the beam that is emitted from the center of the display area of the display element and passes through the cross sections of the ocular optical system, according to the second embodiment.
Figure 18:
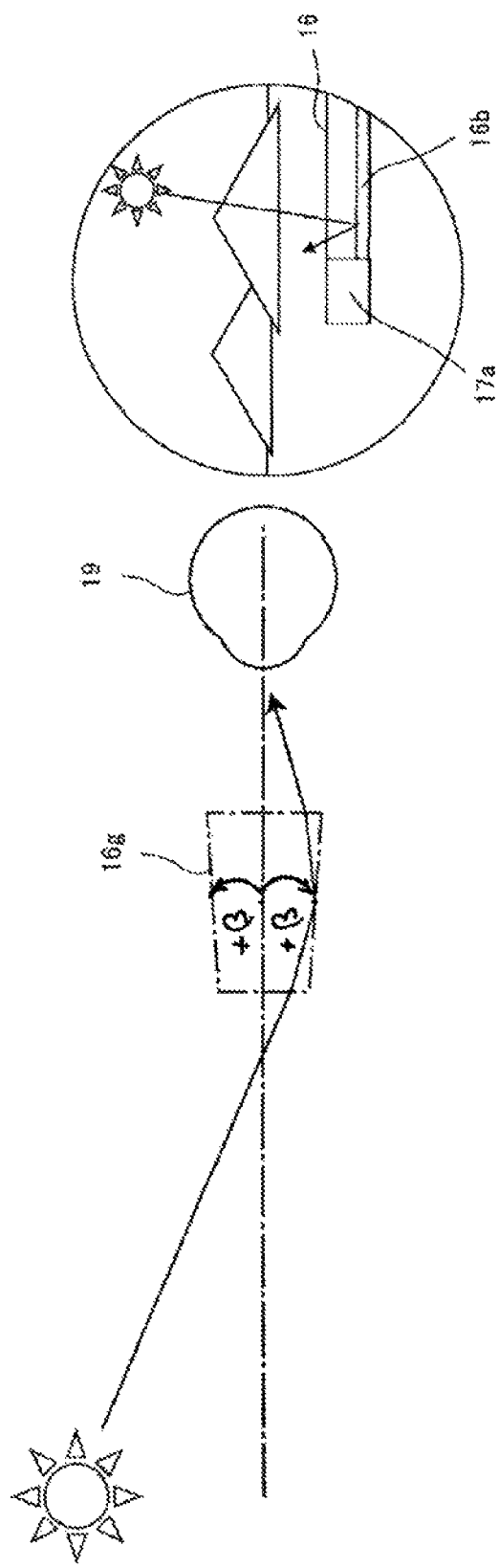
FIG. 18 is a diagram that illustrates an example of the sunlight according to the second embodiment.

FIG. 12 is a perspective view of examples of the display element 15 and the ocular optical system 14 that are included in the attachable image display device 11 according to the second embodiment. FIG. 13 is a perspective view of the ocular optical system 14 according to the second embodiment, as viewed from a different direction than that of FIG. 12. FIG. 14 is a plan view of the display element 15 and the ocular optical system 14 according to the second embodiment. FIG. 15 illustrates a shape of the cross section 16g of the light guiding prism 16 according to the second embodiment FIGS. 16 and 17 are diagrams that illustrate examples of a beam that is emitted from the center of the display area of the display element 15 and passes through the cross sections of the ocular optical system 14, according to the second embodiment. FIG. 18 is a diagram that illustrates an example of the sunlight according to the second embodiment. The cross sections of the housing 13, the display element 15, and the ocular optical system 14 that are included in the attachable image display device 11 according to the second embodiment are similar to those illustrated in FIG. 9.

In the second embodiment, in FIGS. 12 to 15, the sides 16a and 16b of the light guiding prism 16 each have a negative inclination angle (−α) to the optical axis 18a in the positive direction of the optical axis 18a, and a positive inclination angle (+β) to the optical axis 18b in the positive direction of the optical axis 18b. Here, an absolute value of the negative inclination angle is a value greater than D/(48n) radians. Further, an absolute value of the positive inclination angle is a value greater than d/L radians. D and n are as described in the first embodiment. d is a distance from an intersection point of the optical axes 18a and 18b to the side 16a or to the side 16b in the vertical direction with respect to the plane including the optical axes 18a and 18b. L is a position of a virtual image of a display surface of the display element 15 as viewed from the intersection point of the optical axes 18a and 18b. Specifically, L is obtained by L=(n/nc)×L1+n×L3, where L1 is a thickness of a cover glass 15a that is provided on the display surface of the display element 15, nc is a refractive index of the cover glass 15a, L2 is a distance between the cover glass 15a and an incident surface of the light guiding prism 16 (a surface of incidence of image light from the display element 15), and L3 is a distance between the incident surface and the intersection point of the optical axes 18a and 18b, as illustrated in FIG. 14. This calculation formula is based on a calculation formula of L which will be described later in a fourth embodiment.

The cross sections 16f, 16g, and 16h of the light guiding prism 16 each have a trapezoidal shape due to the sides 16a and 16b of the light guiding prism 16 having the inclinations described above. As illustrated in FIG. 15, the cross section 16g has a trapezoidal shape having two opposing sides parallel to each other, in which one side situated on the side of the eye 19 of the user is a long side.

In the light guiding prism 16 having the configuration described above, the intersection line of the side 16a and the cross section 16f and the intersection line of the side 16b and the cross section 16f each have a negative inclination angle (−α) to the optical axis 18a in the positive direction of the optical axis 18a, and an intersection line of the side 16a and the cross section 16h and an intersection line of the side 16b and the cross section 16h each have a positive inclination angle (+α) to the optical axis 18b in the positive direction of the optical axis 18b.

For example, as illustrated in FIG. 16, when a beam is emitted from the center of the display area of the display element 15 and passes through each of the cross sections 16f, 16h, and 17b of the ocular optical system 14, the ocular optical system 14 having the configuration described above makes it possible to divert, from the pupil of the user (the pupil of the eye 19), the beam reflected off the side 16a (or the side 16b) before it is reflected off the reflection surface 16e. The reason for this is as described in the first embodiment. Thus, it is possible to prevent a ghost image from occurring due to such a beam.

For example, as illustrated in FIG. 17, after it is reflected off the reflection surface 16e, the beam is emitted from the ocular optical system 14 without being reflected off the side 16a (or the side 16b), so as to also be diverted from the pupil of the user the pupil of the eye 19). The reason for this is as follows.

The inclination angle of a beam that is emitted from the center of the display area of the ocular optical system 15 and directed to an intersection point of an intersection line of the cross section 16f and the cross section 16h with the side 16a is d/L. d and L are as described above. Thus, when the side 16a has a positive inclination angle (+β) to the optical axis 18b in the positive direction of the optical axis 18b, the beam emitted from the center of the display area of the display element 15 does not hit the side 16a after it is reflected off the reflection surface 16e, so as to be diverted from the pupil of the user. Therefore, it is also possible to prevent a ghost image from occurring due to, for example, the beam indicated in FIG. 11.

In the second embodiment, as described above, the side 16b of the light guiding prism 16 has a positive inclination angle (+β) to the optical axis 18b in the positive direction of the optical axis 18b (see, for example, FIG. 15). Thus, for example, as illustrated in FIG. 18, after light from the sun situated in the sky in front of the user enters the side 16d of the light guiding prism 16 and is reflected off the side 16b, the light from the sun may he emitted from the side 16c and may enter the pupil of the user (the pupil of the eye 19;. In this case, the user may experience white glare due to the side 16b off which the light from the sun is reflected. Such glare due to the sunlight can be prevented by the aspects in the embodiments described after this.

<Third Embodiment>

As in the example of an attachment illustrated in FIG. 5, an attachable image display device according to a third embodiment is fixed on a rim of glasses, and is worn on the head of a user when the user wears the glasses, although this is not illustrated. The attachable image display device according to the third embodiment includes a housing fixed on the rim of the glasses, a display element arranged in the housing, and an ocular optical system held by the housing, as in the case of the attachable image display device 11 according to the first or second embodiment.

Figure 19:
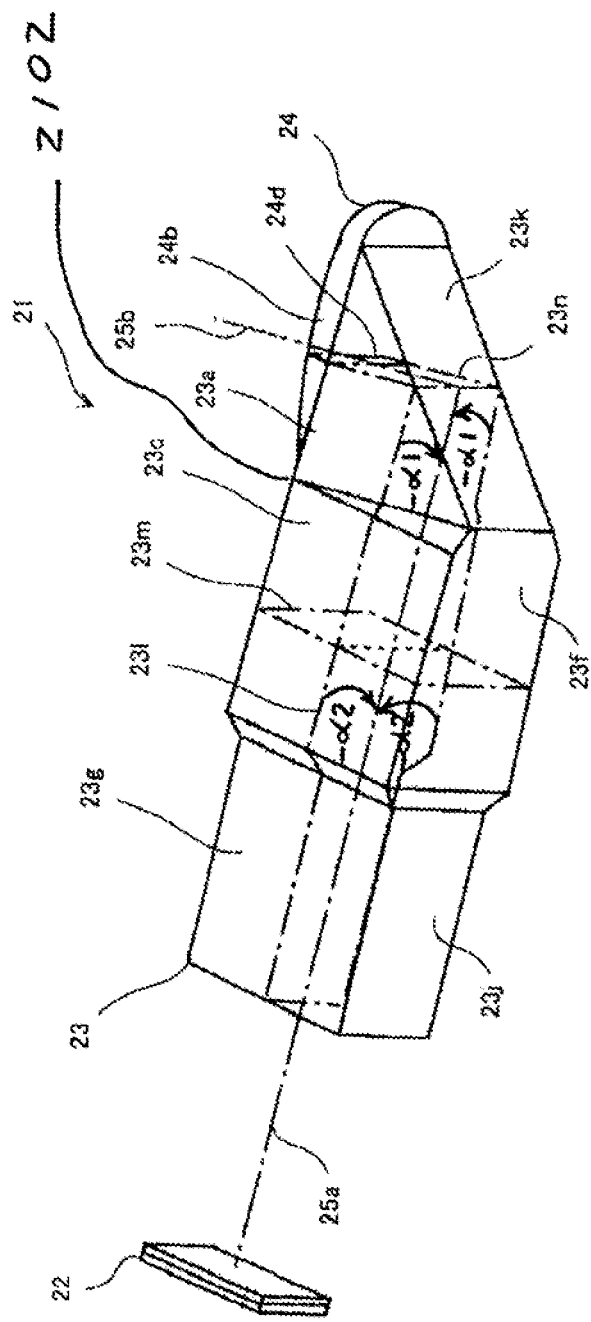
FIG. 19 is a perspective view of examples of a display element and an ocular optical system that are included in an attachable image display device according to a third embodiment.
Figure 20:
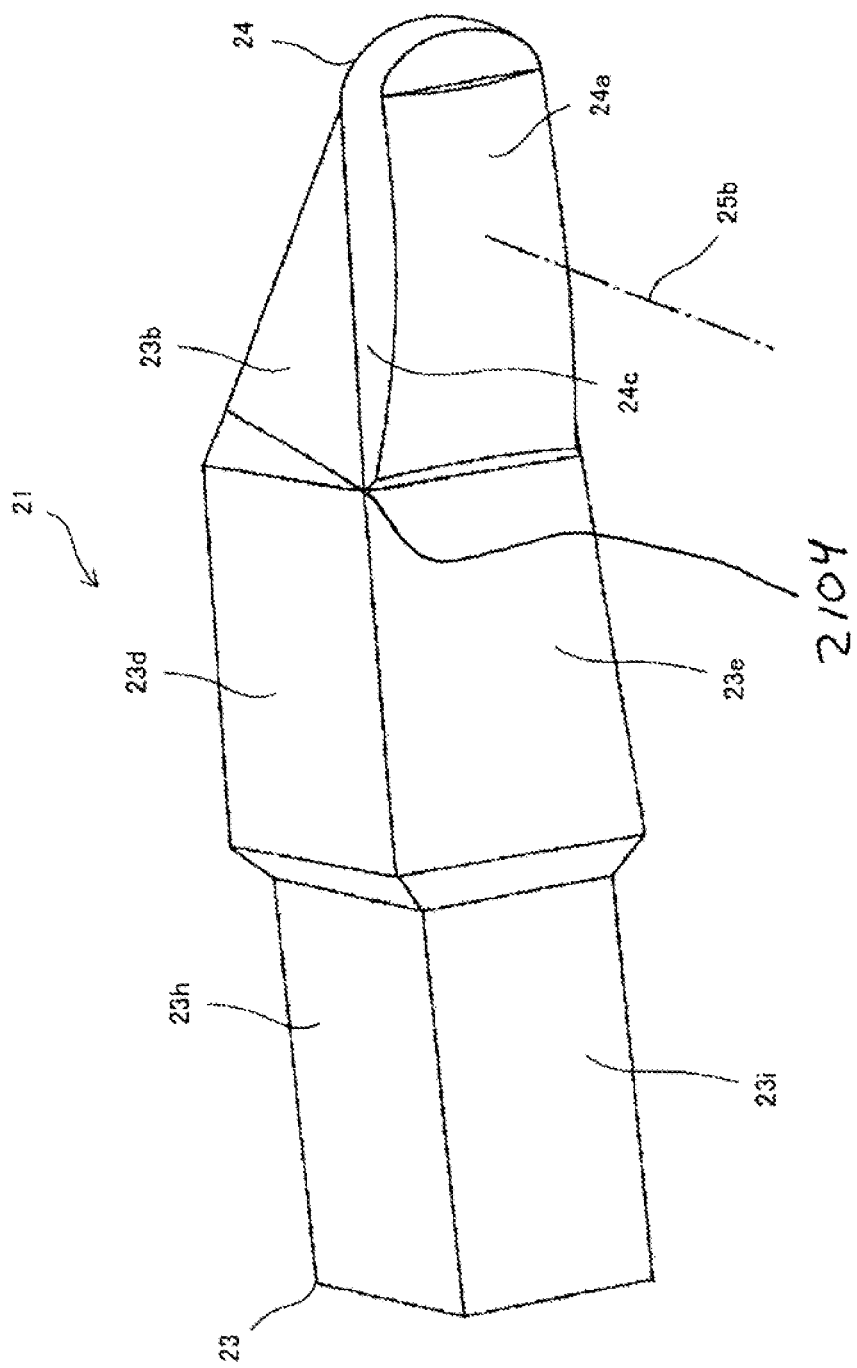
FIG. 20 is a perspective view of the ocular optical system according to the third embodiment, as viewed from a different direction than that of FIG. 19.
Figure 21:
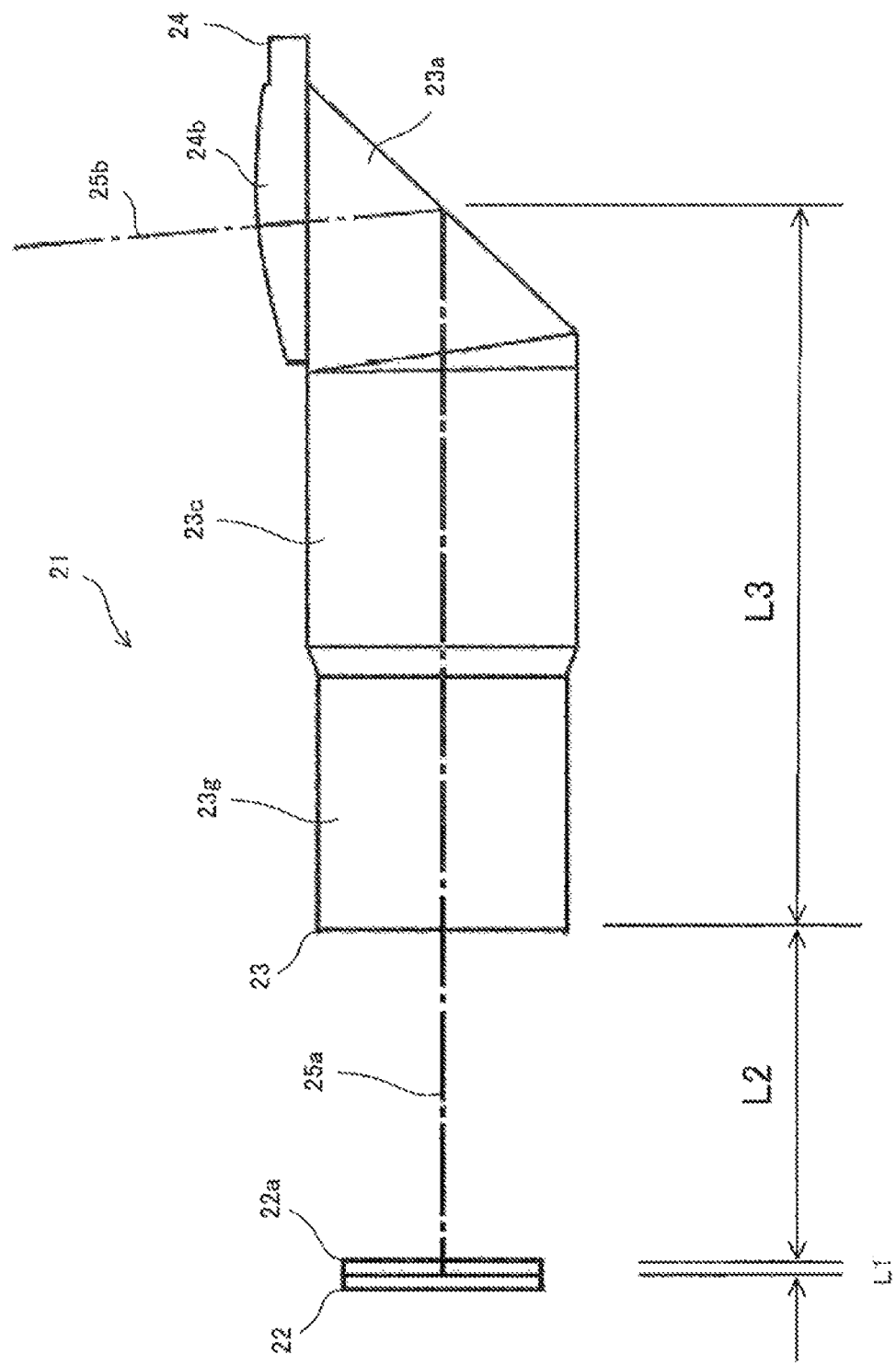
FIG. 21 is a plan view of the display element and the ocular optical system according to the third embodiment.
Figure 22:
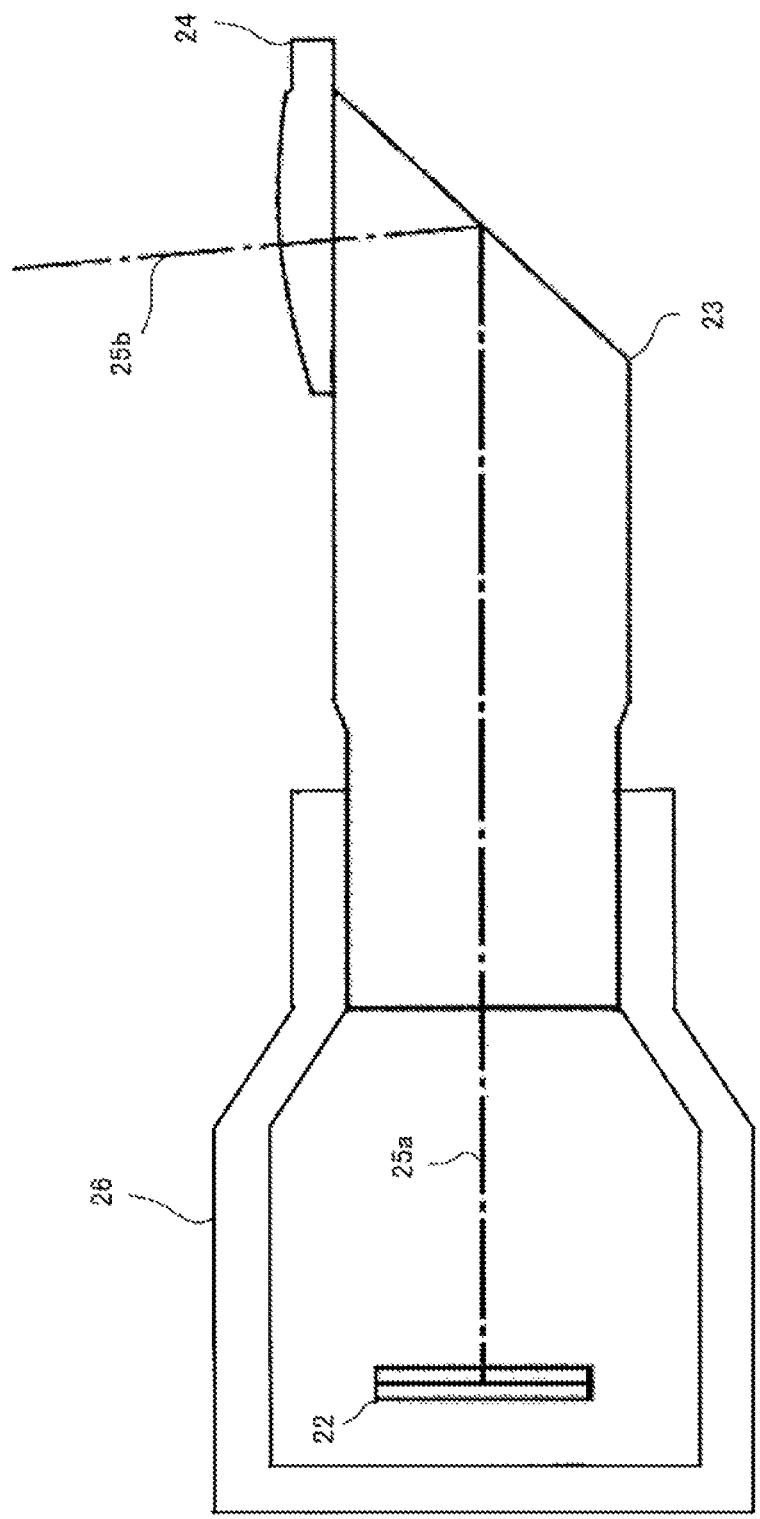
FIG. 22 is a cross-sectional view of a housing, the display element, and the ocular optical system that are included in the attachable image display device according to the third embodiment.
Figure 23:
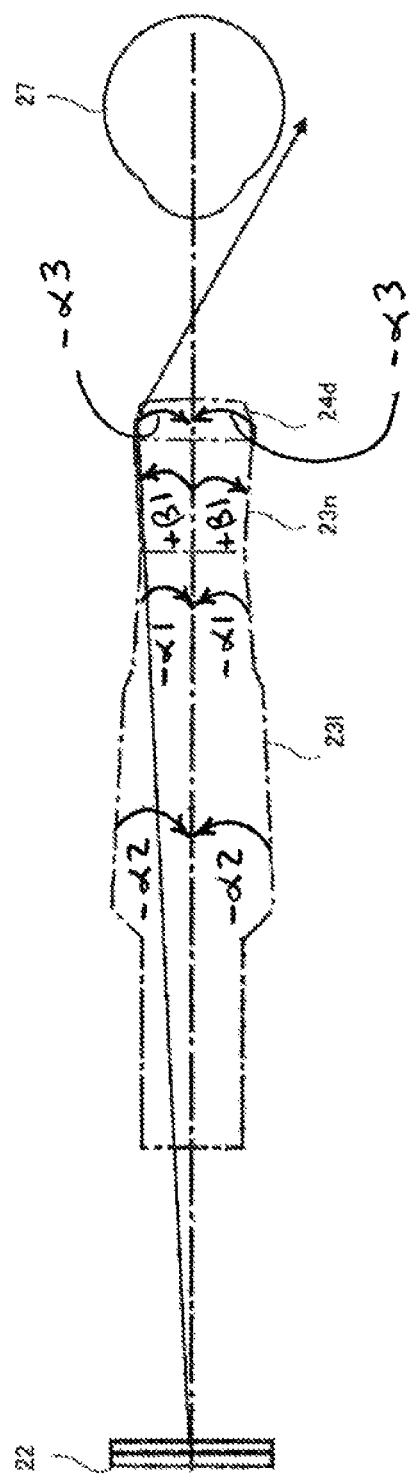
FIG. 23 is a diagram that illustrates an example of a beam that is emitted from the center of a display area of the display element and passes through cross sections of the ocular optical system, according to the third embodiment.
Figure 24:
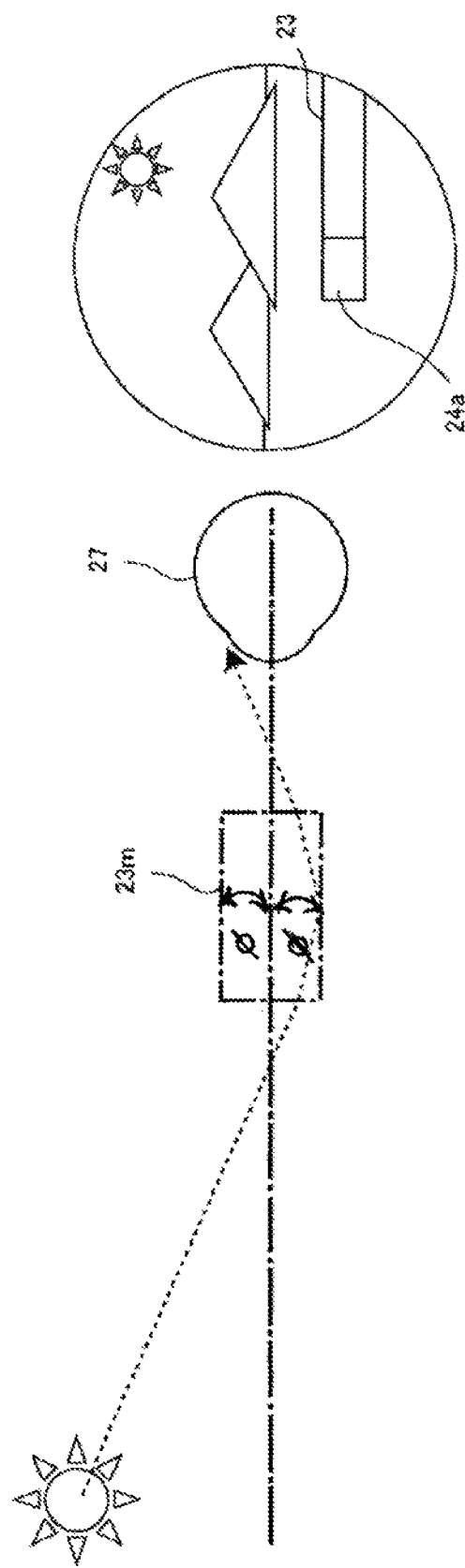
FIG. 24 is a diagram that illustrates an example of the sunlight according to the third embodiment.

FIG. 19 is a perspective view of examples of the display element and the ocular optical system that are included in the attachable image display device according to the third embodiment. FIG. 20 is a perspective view of the ocular optical system according to the third embodiment, as viewed from a different direction than that of FIG. 19. FIG. 21 is a plan view of the display element and the ocular optical system according to the third embodiment. FIG. 22 is a cross-sectional view of the housing, the display element, and the ocular optical system that are included in the attachable image display device according to the third embodiment. FIG. 23 is a diagram that illustrates an example of a beam that is emitted from the center of a display area of the display element and passes through cross sections of the ocular optical system, according to the third embodiment. FIG. 24 is a diagram that illustrates an example of the sunlight according o the third embodiment.

In FIGS. 19 to 22, an ocular optical system 21 includes a light guiding prism 23 that guides image light from a display element 22, and an emission portion 24 that emits the image light guided by the light guiding prism 23 to an eye of the user.

The light guiding prism 23 includes ten sides 23a, 23b, 23c, 23d, 23e, 23f, 23g, 23h, 23i, and 23j that are arranged to surround a light path of the image light from the display element 22, and a reflection surface 23k off which the image light from the display element 22 is reflected to the emission portion 24.

The emission portion 24 includes an emission surface 24a that has a positive refractive power and two sides 24b and 24c, and the emission surface 24a emits the image light reflected off the reflection surface 23k.

An optical axis 25 (25a and 25b) is a beam emitted from the center of a display area of the display element 22 to pass through the center of the emission surface 24a of the emission portion 24 without being reflected off an surface other than the reflection surface 23k. It is assumed that, in the beam, a portion of the beam before the beam is reflected off the reflection surface 23k is the optical axis 25a and a portion of the beam after the beam is reflected off the reflection surface 23k is the optical axis 25b. Further, it is assumed that the direction in which the portion of the beam before the beam is reflected off the reflection surface 23k travels is a positive direction of the optical axis 25a and the direction in which the portion of the beam after the beam is reflected off the reflection surface 23k travels is a positive direction of the optical axis 25b.

The sides 23a and 23b of the light guiding prism 23 are surfaces that are arranged on opposite sides of a plane including the optical axes 25a and 25b and that are situated between the emission portion 24 and the reflection surface. 23k, and each have a negative inclination angle (−α1) I to the optical axis 25a in the positive direction of the optical axis 25a, and a positive inclination angle (+β1) to the optical axis 25b in the positive direction of the optical axis 25b. Here, an absolute value of the negative inclination angle is a value greater than D/(48n) radians. An absolute value of the positive inclination angle is a value greater than d/(2L) radians, D and n are as described in the first embodiment. In other words, D is an opening size of the emission surface 24a of the emission portion 24 in a vertical direction with respect to the plane including the optical axes 25a and 25b, and n is a refractive index of the light guiding prism 23. d and L are as described in the second embodiment. In other words, d is a distance from an intersection point of the optical axes 25a and 25b to the side 23a or to the side 23b in the vertical direction with respect to the plane including the optical axes 25a and 25b. L is a position of a virtual image of a display surface of the display element 22 as viewed from the intersection point of the optical axes 25a and 25b. Specifically, L is obtained by L=(n/nc)×L1+n×L2+ L3, where L1 is a thickness of a cover glass 22a that is provided on the display surface of the display element 22, nc is a refractive index of the cover glass 22a, L2 is a distance between the cover glass 22a and an incident surface of the light guiding prism 23 (a surface of incidence of image light from the display element 22), and L3 is a distance between the incident surface and the intersection point of the optical axes 25a and 25b, as illustrated in FIG. 21. This calculation formula is based on the calculation formula of L which will be described later in the fourth embodiment.

The sides 23c and 23d of the light guiding prism 23 are surfaces that are arranged on opposite sides of the plane including the optical axes 25a and 25b, and each have a negative inclination angle to the plane including the optical axes 25a and 25b in the positive direction of the optical axis 25a. Here, an absolute value of the negative inclination angle is a value greater than D/(48n) radians. D and n are as described above.

The sides 23e and 23f of the light guiding prism 23 are surfaces that are arranged parallel to a plane that includes the optical axis 25a and that is perpendicular to the plane including the optical axes 25a and 25b. The sides 23e and 23f are polished, which makes it possible to view the outside world from the user's eye through the sides 23e and 23f.

The sides 23g and 23h of the light guiding prism 23 are surfaces arranged parallel to the plane including the optical axes 25a and 25b. The length between the sides 23g and 23h in the vertical direction with respect to the plane including the optical axes 25a and 25b is shorter than the length between the sides 23c and 23d in the vertical direction with respect to the plane including the optical axes 25a and 25b, the length between the sides 23c and 23d being situated closest to the display element 22.

The sides 23i and 23j of the light guiding prism 23 are surfaces that are arranged parallel to the plane that includes the optical axis 25a and that is perpendicular to the plane including the optical axes 25a and 25b.

A portion of or all of the sides 23g, 23h, 23i, and 23j of the light guiding prism are used when the ocular optical system 21 is held by a housing 26, for example, as illustrated in FIG. 22.

The sides 24b and 24c of the emission portion 24 are surfaces that are arranged on opposite sides of the plane including the optical axes 25a and 25b, and each have a negative inclination angle to the optical axis 25b in the positive direction of the optical axis 25b.

A cross section 23l of the light guiding prism 23 is a cross section corresponding to the plane that includes the optical axis 25a and that is perpendicular to the plane including the optical axes 25a and 25b. A cross section 23m of the light guiding prism 23 is a cross section corresponding to a plane that is perpendicular to the optical axis 25a and that is situated closer to the display element 22 than the side 23a and closer to the emission portion 24 than the side 23g. A cross section 23n of the light guiding prism 23 and a cross section 24d of the emission portion 24 are cross sections corresponding to a plane that includes the optical axis 25b and that is perpendicular to the plane including the optical axes 25a and 25b. The cross section 23m of the light guiding prism 23 has a rectangular or square shape, and the cross section 23n of the light guiding prism 23 has a trapezoidal shape. The cross sections 23l, 23m, 23n, and 24d are also cross sections of the ocular optical system 21.

In the light guiding prism 23 having the configuration described above, an intersection line of the side 23a and the cross section 23l and an intersection line of the side 23b and the cross section 23l each have a negative inclination angle $(-\alpha 1)$ to the optical axis 25a in the positive direction of the optical axis 25a, and an intersection line of the side 23a and the cross section 23n and an intersection line of the side 23b and the cross section 23n each have a positive inclination angle $(+\beta 1)$ to the optical axis 25b in the positive direction of the optical axis 25b. An intersection line of the side 23c and the cross section 23l and an intersection line of the side 23d and the cross section 23l each have a negative inclination angle $(+\alpha 2)$ to the optical axis 25a in the positive direction of the optical axis 25a.

For example, as illustrated in FIG. 23, when a beam is emitted from the center of the display area of the display element 22 and passes through each of the cross sections 23l, 23n, and 24d of the ocular optical system 21, the ocular optical system 21 having the configuration described above makes it possible to divert, from a pupil of the user (a pupil of an eye 27), the beam which is reflected off the side 23a (or 23b) after it is reflected off the reflection surface 23k, because it is further reflected off the side 24b (or 24c). The reason for this is as follows.

It is assumed that the positive inclination angle $(+\beta 1)$ of the side 23a of the light guiding prism 23 (the positive inclination angle which the side 23a has with the optical axis 25b in the positive direction of the optical axis 25b) is $d/(2L)$. d and L are as described above. Then, when a beam emitted from the center of the display area of the display element 22 is reflected off the side 23a after it is reflected off the reflection surface 23k, the beam travels parallel to the optical axis 25b or in a diffusion direction. Thus, the beam is blocked by the side 24b of the emission portion 24 that has a negative inclination angle $(-\alpha 3)$ to the optical axis 25b in the positive direction of the optical axis 25b, so as to not enter the pupil of the user. Thus, if the positive inclination angle $(+\beta 1)$ of the side 23a of the light guiding prism 23 (the positive inclination angle which the side 23a has with the optical axis 25b in the positive direction of the optical axis 25b) is greater than $d/(2L)$ radians, it is possible to prevent a ghost image from occurring due to light reflected off the side 23a after it is reflected. off the reflection surface 23k.

The ocular optical system 21 having the configuration described above also makes it possible to divert, from the pupil of the user, the beam reflected off the side 23a or 23c (or the side 23b or 23d) before it is reflected off the reflection surface 23k, although this is not illustrated. The reason for this has been described in the first embodiment.

Further, the side 23d of the light guiding prism 23 has a zero inclination angle (Ø) to the plane including the optical axes 25a and 25b in the positive direction of the optical axis 25b, so, for example, as illustrated in FIG. 24, the ocular optical system 21 having the configuration described above makes it possible to divert, from the pupil of the user (the pupil of the eye 27), the light from the sun situated in the sky in front of the user even if it is emitted from the side 23e of the light guiding prism 23 after it enters the side 23f and is reflected off the side 23d. Thus, the user will never experience the glare due to the sunlight reflected off the side 23d of the light guiding prism 23.

Furthermore, in the ocular optical system 21 having the configuration described above, the light guiding prism 23 is configured to have the sides 23g and 23h parallel to each other and to have the sides 23i and 23j parallel to each other, which makes it possible to easily adjust to what extent the ocular optical system 21 is to be inserted into the housing 26 (such as to easily optically adjust positions of the display element 22 and the ocular optical system 21) upon, for example, manufacturing or assembling. Further, it becomes easier to design the housing 26 than when a portion having a non-constant thickness is held.

Moreover, the ocular optical system 21 having the configuration described above makes it possible to make the housing 26 smaller because, in the light guiding prism 23, a portion surrounded by the sides 23g, 23h, 23i, and 23j which is used when the ocular optical system 21 is held by the housing 26 is narrower than a portion surrounded by the sides 23c, 23d, 23e, and 23f.

<Fourth Embodiment>

The attachable image display device according to a fourth embodiment includes the light guiding prism 23 of the attachable image display device according to the third embodiment, in which the surface of incidence of image light from the display element 22 has been changed to an incident surface that has a refractive power and the length between the sides 23c and 23d in the vertical direction with respect to the plane including the optical axes 25a and 25b has been changed to a shorter one.

In order to facilitate understanding, like reference numbers used in the third embodiment are used to describe the fourth embodiment.

Figure 25:
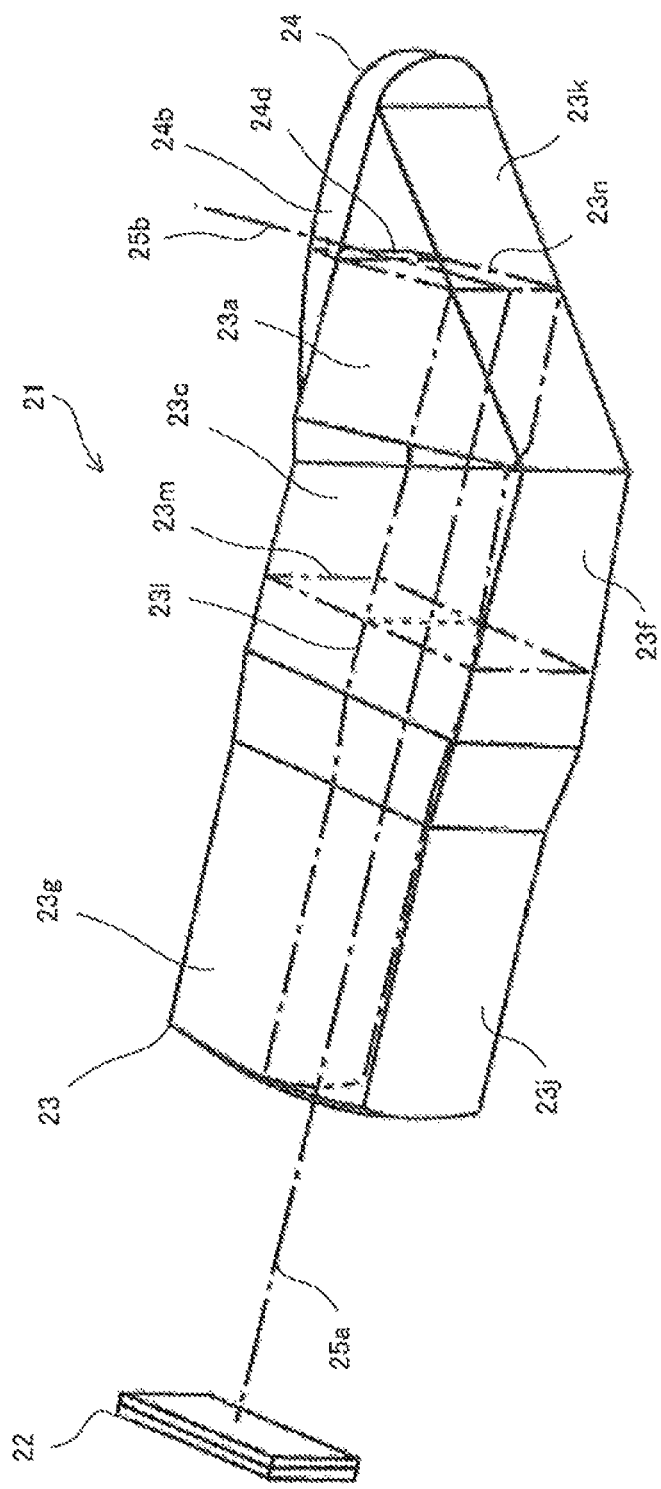
FIG. 25 is a perspective view of examples of the display element and the ocular optical system that are included in the attachable image display device according to a fourth embodiment.
Figure 26:
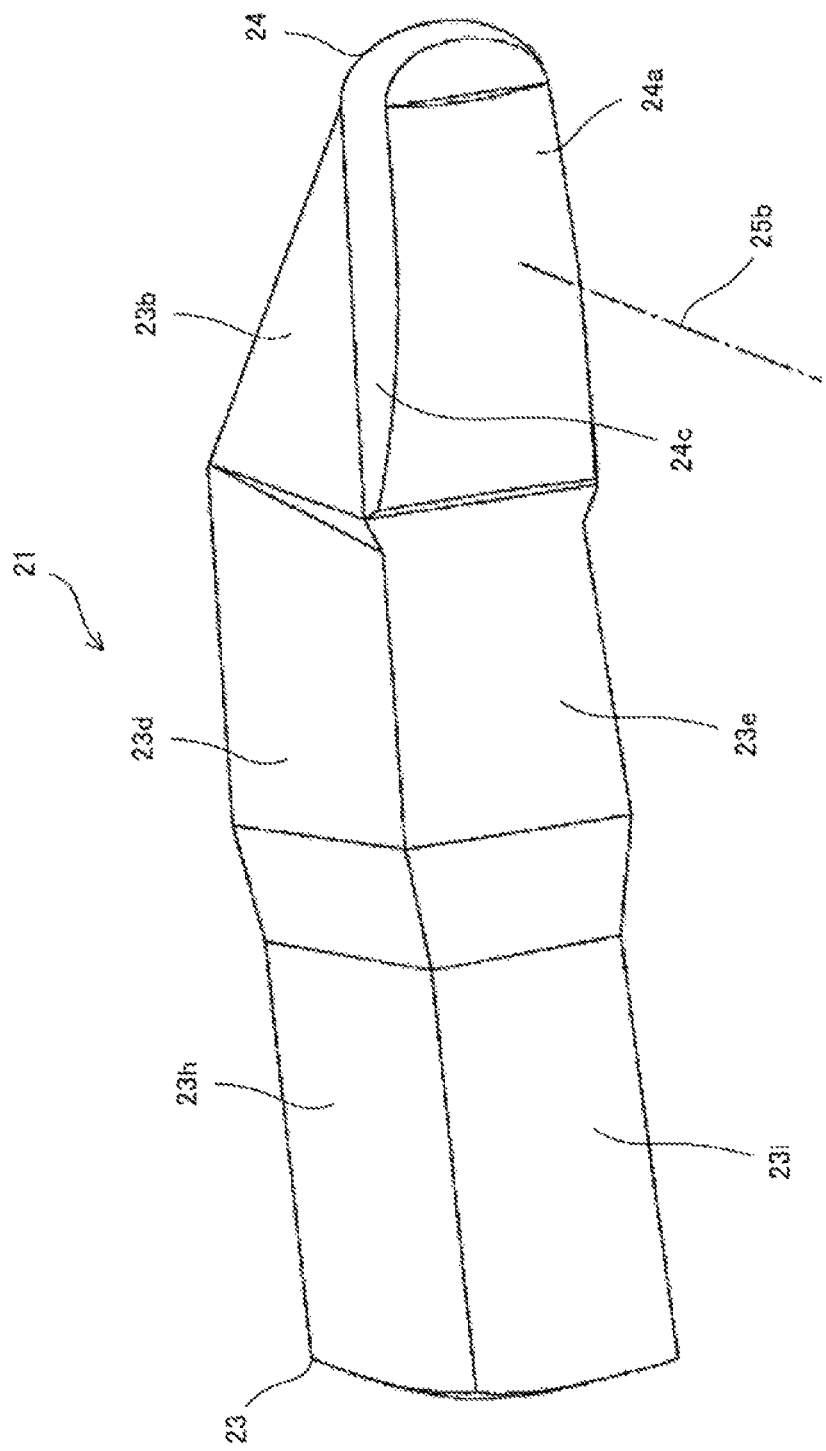
FIG. 26 is a perspective view of the ocular optical system according to the fourth embodiment, as viewed from a different direction than that of FIG. 25.
Figure 27:
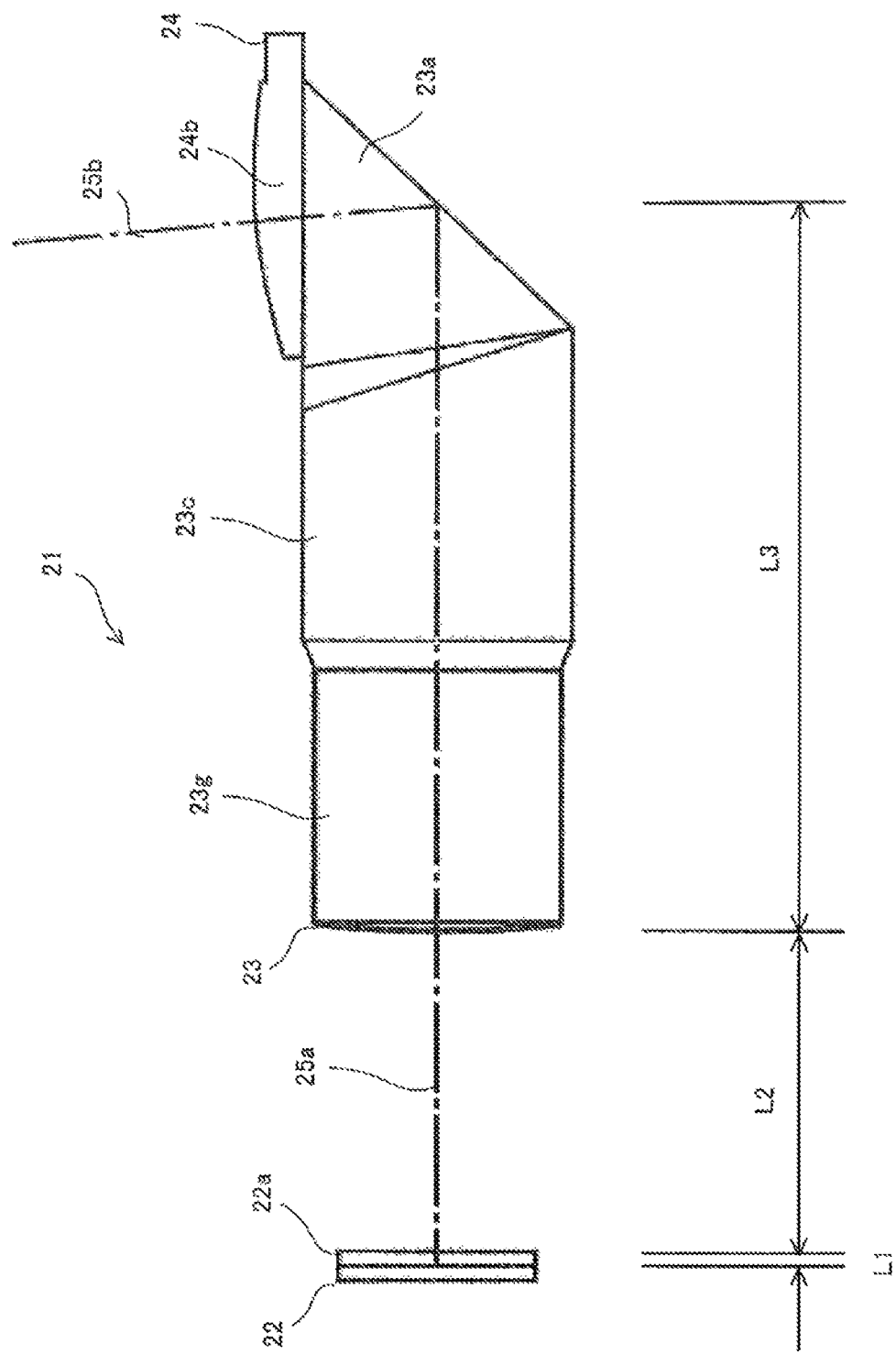
FIG. 27 is a plan view of the display element and the ocular optical system according to the fourth embodiment.

FIG. 25 is a perspective view of examples of the display element 22 and the ocular optical system 21 that are included in the attachable image display device according to the fourth embodiment. FIG. 26 is a perspective view of the ocular optical system 21 according to the fourth embodiment, as viewed from a different direction than that of FIG. 25. FIG. 27 is a plan view of the display element 22 and the ocular optical system 21 according to the fourth embodiment.

In the fourth embodiment, in FIGS. 25 to 27, the incident surface of the light guiding prism 23, on which image light from the display element 22 is incident, has a refractive power.

Further, in the fourth embodiment, the length between the sides 23c and 23d of the light guiding prism 23 in the vertical direction with respect to the plane including the optical axes 25a and 25b is made shorter than that in the third embodiment. In this case, the light guiding prism 23 according to the third embodiment is configured such that one apex of the side 23c and one apex of the side 23a are in contact with each other (as indicated at 2102 in FIG. 19) on the side of the side 23e and one apex of the side 23d and one apex of the side 23b are in contact with each other (as indicated at 2104 in FIG. 20) on the side of the side 23e, but the light guiding prism 23 according to the fourth embodiment is configured such that one apex of the side 23c and one apex of the side 23a are in contact with each other on the side of the side 23f and one apex of the side 23d and one apex of the side 23b are in contact with each other on the side of the side 23f. This results in making the length between the sides 23c and 23d in the vertical direction with respect to the plane including the optical axes 25a and 25b shorter than that in the third embodiment.

Further, in the fourth embodiment, the incident surface of the light guiding prism 23 has a refractive power, so L that is a position of a virtual image of the display surface of the display element 22 as viewed from the intersection point of the optical axes 25a and 25b is calculated as below.

As illustrated in FIG. 27, L1 is a thickness of the cover glass 22a that is provided on the display surface of the display element 22, L2 is a distance between the cover glass 22a and the incident surface of the light guiding prism 23 (the incident surface having a refractive power), and L3 is a distance between the incident surface and the intersection point of the optical axes 25a and 25b. n is a refractive index of the light guiding prism 23, and nc is a refractive index of the cover glass 22a. P is the refractive power of the incident surface of the light guiding prism, and R is a curvature. La is an air-equivalent light path length from the display surface of the display element 22 to the incident surface of the light guiding prism 23. Li is a distance from the incident surface of the light guiding prism 23 to the virtual image of the display surface of the display element 22 as viewed from the inside of the light guiding prism 23. Here, La is obtained by La=L1/nc+L2. P is obtained by P=(n−1)/R. According to a formula for image formation, 1/La−1/(Li/n)=P, with the result that Li=n/(1/La−P). Accordingly, L that is a position of a virtual image of the display surface of the display element 22 as viewed from the intersection point of the optical axes 25a and 25b can be obtained by L=Li+L3 =n/(1/La−P)+L3.

The ocular optical system 21 having the configuration described above also provides an advantage similar to that in the third embodiment.

In the fourth embodiment, the sides 23g and 23h of the light guiding prism 23 may have rough surfaces or may be provided with light blocking grooves, in order for light that is emitted from the display element 22 and reflected off the sides 23g and 23h to not enter the pupil of the user.

Figure 28:
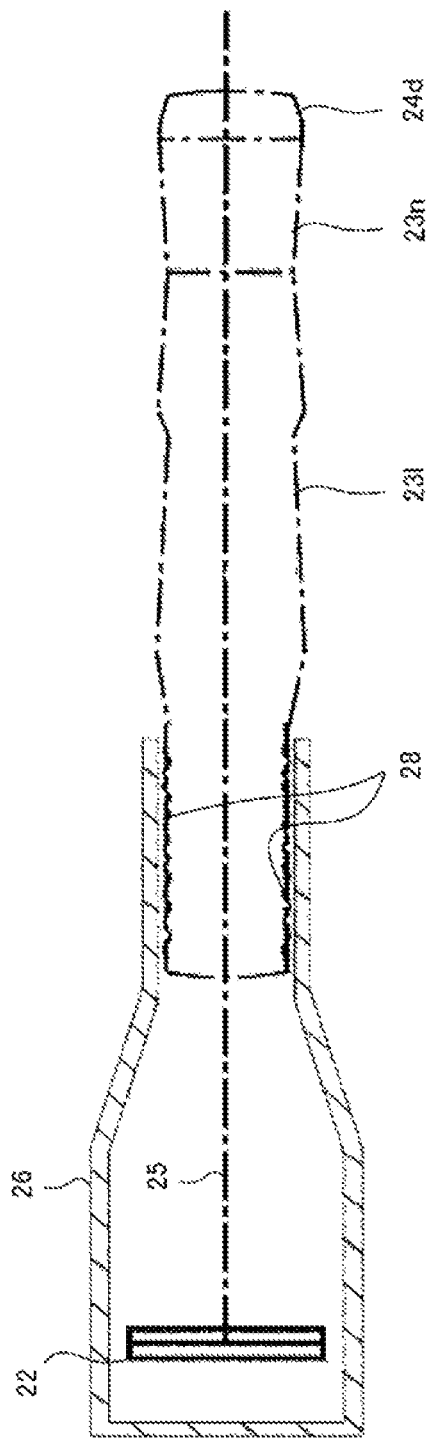
FIG. 28 illustrates an example in which sides of a light guiding prism have rough surfaces in the fourth embodiment.
Figure 29:
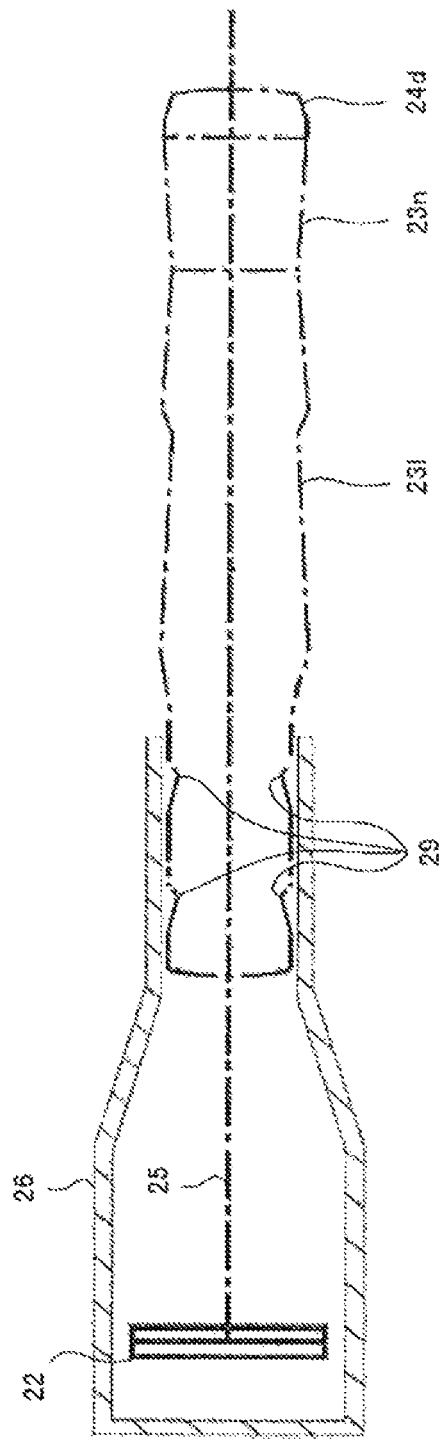
FIG. 29 illustrates an example in which the sides of the light guiding prism are provided with light blocking grooves in the fourth embodiment.

FIG. 28 illustrates an example in which the sides 23g and 23h have rough surfaces, and FIG. 29 illustrates an example in which the sides 23g and 23h are provided with light blocking grooves.

In the examples of FIGS. 28 and 29, a rough surface 28 or a light blocking groove 29 is provided in a portion of each of the sides 23g and 23h that is used when the ocular optical system 21 is held by the housing 26, wherein the rough surface 28 or the light blocking groove 29 is not exposed from the housing 26. This makes it possible to prevent a ghost image from occurring due to a beam that is emitted from the display element 22 and reflected off the side 23g or 23h. Further, for example, when at least portions of the sides 23i and 23j of the light guiding prism 23 that are exposed from the housing 26 are polished and the user can view the outside world through these portions, it is possible to prevent the user from experiencing glare if the sunlight hits these portions due to the rough surface 28 or the light blocking groove 29 so as to be scattered.

The rough surface or the light blocking groove described above is of course applicable to the sides 23g and 23h of the light guiding prism 23 in the third embodiment.

Figure 30:
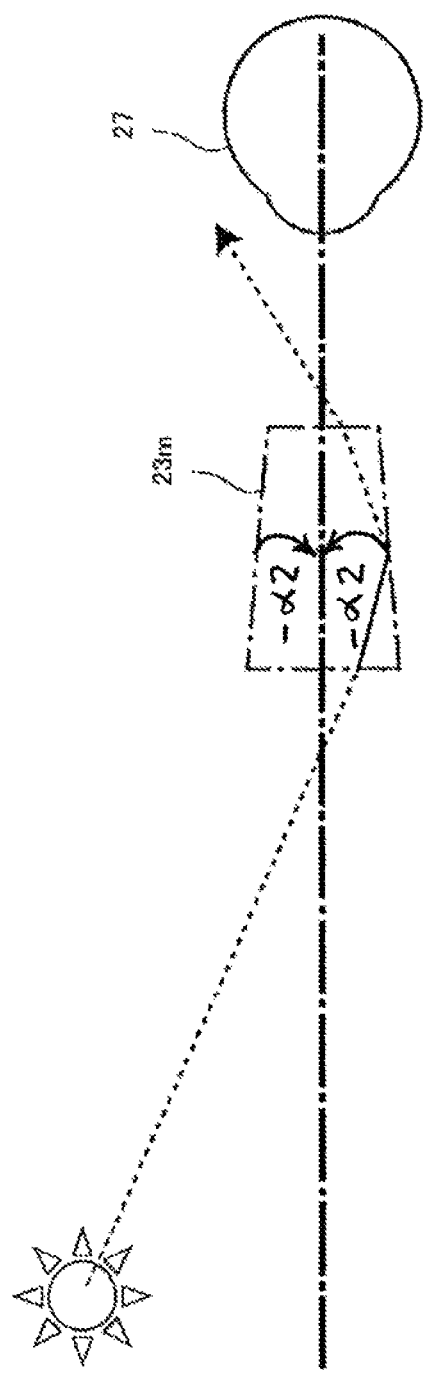
FIG. 30 is a diagram that illustrates an example of the sunlight according to a modification of the third or fourth embodiment.

Further, as described with reference to FIG. 24, it is possible to prevent glare due to the sunlight reflected off the side 23d of the light guiding prism 23 in the third or fourth embodiment, and if it is desired to be more strongly prevented, the side 23d of the light guiding prism 23 may be configured to have a negative inclination angle (−α2 indicated in FIG. 23) to the plane including the optical axes 25a and 25b in the positive direction of the optical axis 25b. This permits the light from the sun situated in the sky in front of the user to further be diverted from the pupil of the user (the pupil of the eye 27) even if it is emitted from the side 23e of the light guiding prism 23 after it enters the side 23f and is reflected off the side 23d, for example, as illustrated in FIG. 30. Thus, the glare of the sunlight reflected off the side 23d can further be prevented. FIG. 30 illustrates an example in which the side 23c of the light guiding prism 23 is also configured to have a negative inclination male (−α2) with the plane including, the optical axes 25a and 25b in the positive direction of the optical axis 25b.

<Fifth Embodiment>

As in the example of an attachment illustrated in FIG. 5, an attachable image display device according to a fifth embodiment is fixed in a rim of glasses, and is worn on the head of a user when the user wears the glasses, although this is not illustrated. The attachable image display device according to the fifth embodiment includes a housing fixed on the rim of the glasses, a display element arranged in the housing, and an ocular optical system held by the housing, as in the case of the attachable image display device according to any one of the first to fourth embodiments.

Figure 31:
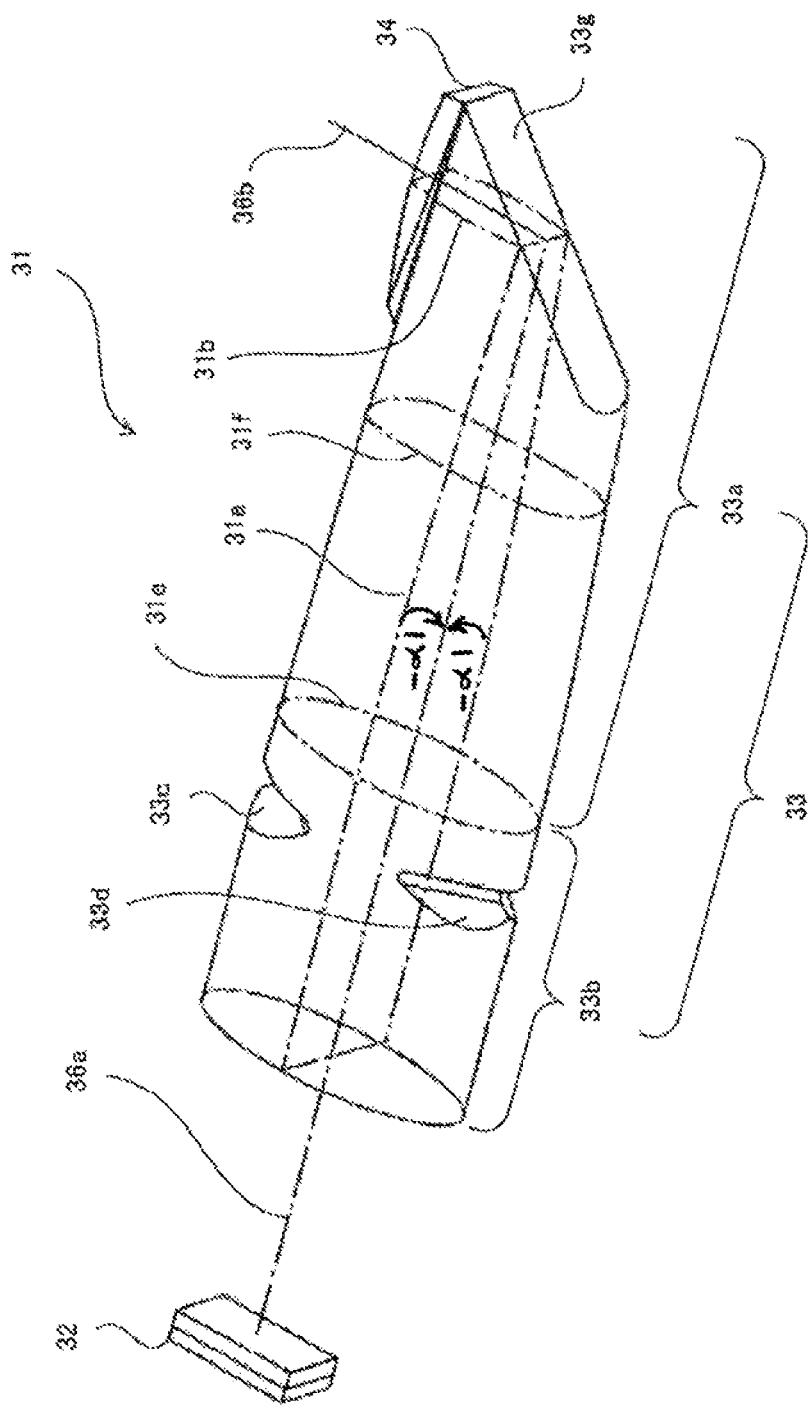
FIG. 31 is a perspective view of examples of a display element and an ocular optical system that are included in an attachable image display device according to a fifth embodiment.
Figure 32:
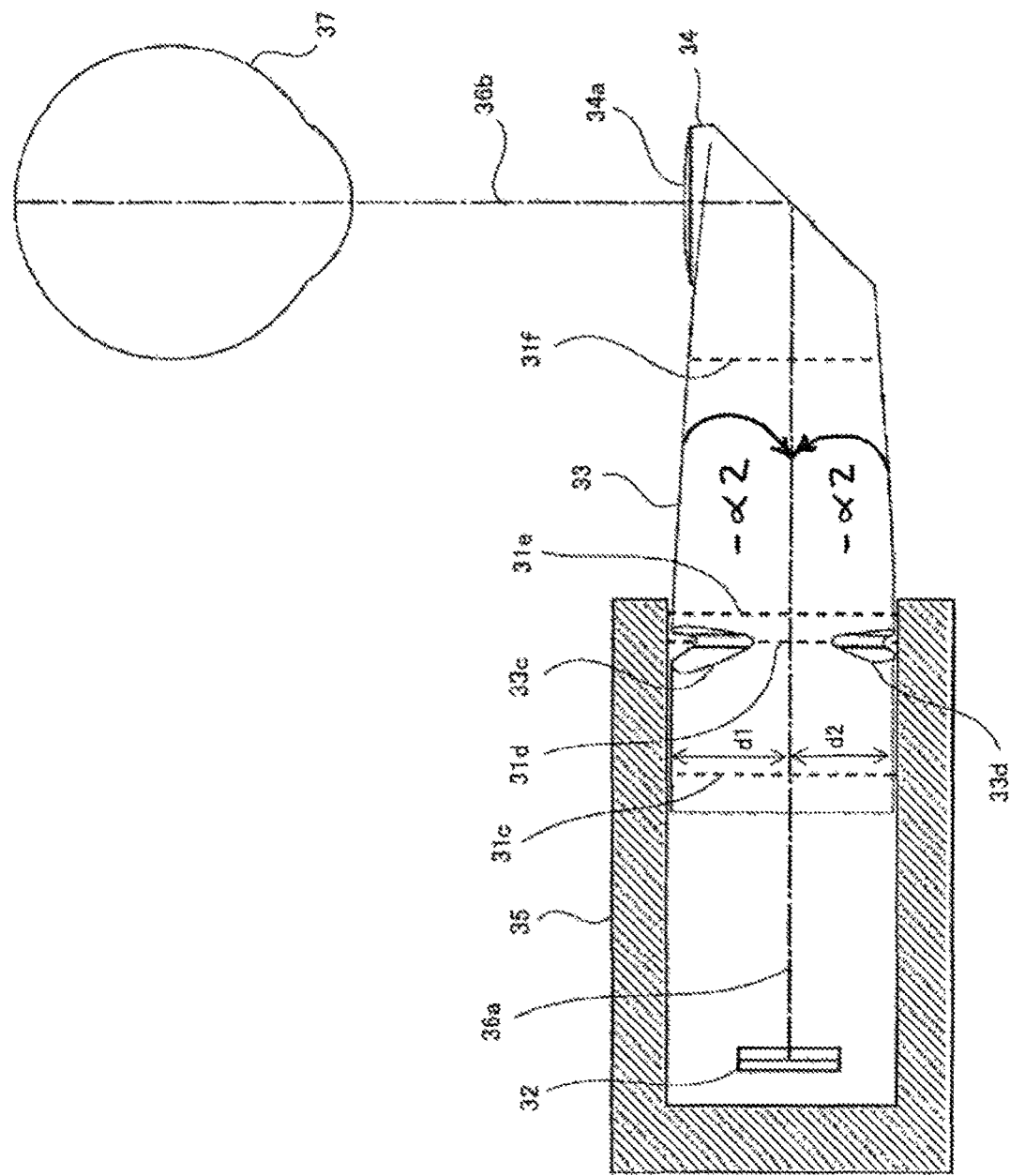
FIG. 32 is a plan view of a housing, the display element, and the ocular optical system according to the fifth embodiment.
Figure 33:
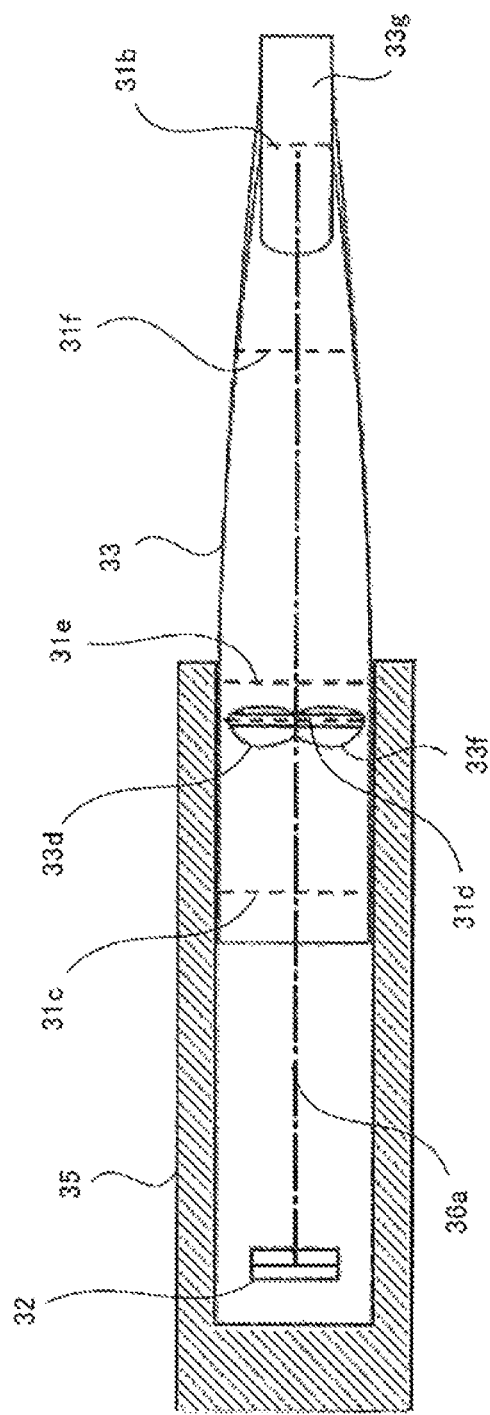
FIG. 33 is a front view of a housing, the display element, and the ocular optical system according to the fifth embodiment.
Figure 34:
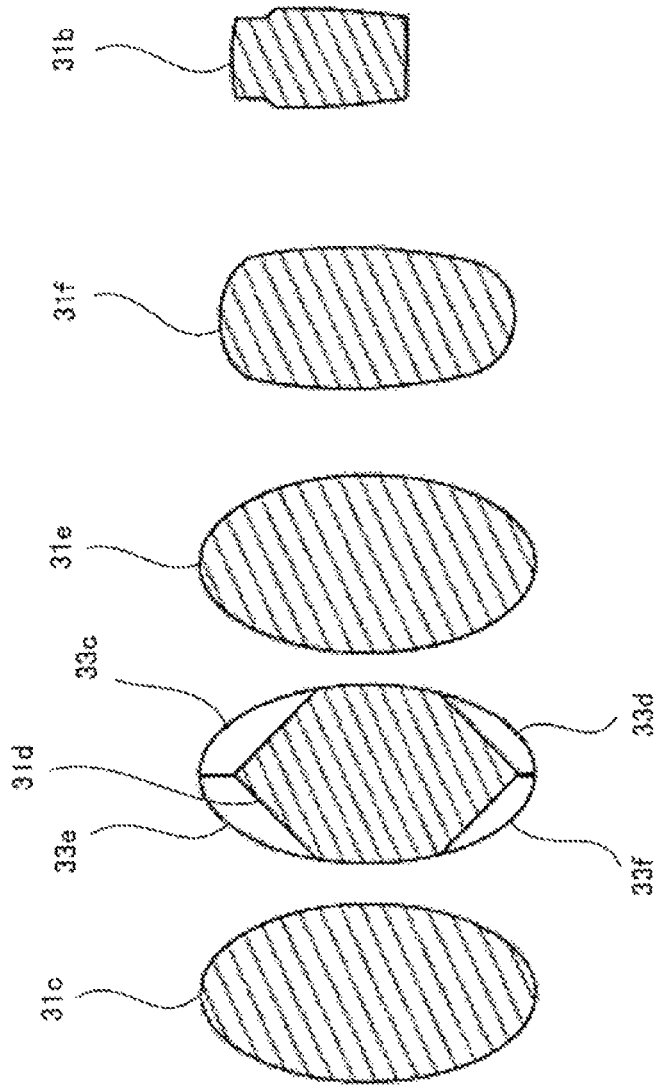
FIG. 34 illustrates cross sections at a plurality of points in the ocular optical system according to the fifth embodiment.
Figure 35:
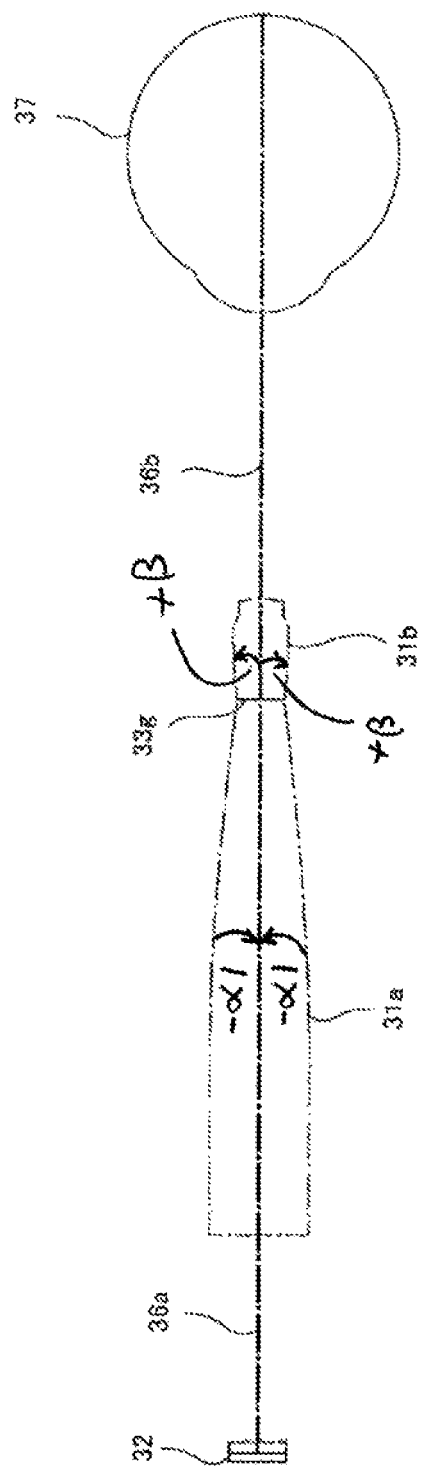
FIG. 35 illustrates the display element, a cross section of the ocular optical system that includes its optical axis, and an eye of a user.

FIG. 31 is a perspective view of examples of the display element and the ocular optical system that are included in the attachable image display device according to the fifth embodiment. FIG. 32 is a plan view of the housing, the display element, and the ocular optical system according to the fifth embodiment (although only the housing is illustrated as a cross section and an eye of a user is also illustrated). FIG. 33 is a front view of the housing, the display element, and the ocular optical system according to the fifth embodiment (although only the housing is illustrated as a cross section). FIG. 34 illustrates cross sections at a plurality of points in the ocular optical system according to the fifth embodiment. FIG. 35 illustrates the display element, a cross section of the ocular optical system that includes its optical axis, and the eye of the user.

In FIGS. 31 to 35, an ocular optical system 31 includes a light guiding prism 33 that guides image light from a display element 32, and an emission portion 34 that emits the image light guided by the light guiding prism 33 to an eye 37 of the user.

The light guiding prism 33 includes a portion 33a that corresponds to the light guiding prism 16 according to the second embodiment, and an elliptic cylindrical portion 33b. The portion 33a of the light guiding prism 33 is equivalent to the light guiding prism 16 of the second embodiment in which the sides 16a, 16b, 16c, and 16d are configured to have curved surfaces. The elliptic cylindrical portion 33b of the light guiding prism 33 is a portion that is used when the ocular optical system 31 is held by a housing 35, and is provided with four light blocking grooves 33c, 33d, 33e. and 33f. The four light blocking grooves 33c, 33d, 33e, and 33f are accommodated in the housing 35 so as to not be exposed.

The light guiding prism 33 includes curved surfaces that are a plurality of sides arranged to surround a light path of the image light from the display element 32, wherein the curved surfaces are sides of the portion 33a that respectively correspond to the sides 16a, 16b, 16c, and 16d of the light guiding prism 16 according to the second embodiment, and sides of the elliptic cylindrical portion 33b. The light guiding prism 33 also includes a reflection surface 33g off which the image light from the display element 32 is reflected to the emission portion 34.

The emission portion 34 includes an emission surface 34a that has a positive refractive power, and the emission surface 34a emits the image light reflected off the reflection surface 33g.

An optical axis 36 (36a and 36b) is a beam emitted from the center of a display area of the display element 32 to pass through the center of the emission surface 34a of the emission portion 34 without being reflected off any surface other than the reflection surface 33g. It is assumed that, in the beam, a portion of the beam before the beam is reflected off the reflection surface 33g is the optical axis 36a and a portion of the beam after the beam is reflected off the reflection surface 33g is the optical axis 36b. Further, it is assumed that the direction in which the portion of the beam before the beam is reflected off the reflection surface 33g travels is a positive direction of the optical axis 36a and the direction in which the portion of the beam after the beam is reflected off the reflection surface 33g travels is a positive direction of the optical axis 36b.

The curved surfaces in the portion 33a of the light guiding prism 33 which respectively correspond to the sides 16a and 16b of the light guiding prism 16 according to the second embodiment are surfaces that are arranged on opposite sides of a plane including the optical axes 36a and 36b and that are situated between the emission portion 34 and a reflection surface 33g. An intersection line of each of these curved surfaces and a plane that includes the optical. axis 36a and that is perpendicular to the plane including the optical axes 36a and 36b has a negative inclination angle (−α1) to the optical axis 36a in the positive direction of the optical axis 36a. Further, an intersection line of each of these curved surfaces and a plane that includes the optical axis 36b and that is perpendicular to the plane including the optical axes 36a and 36b has a positive inclination angle (+β, indicated. FIG. 35) to the optical axis 36b in the positive direction of the optical axis 36b.

The curved surfaces in the portion 33a of the light guiding prism 33 which respectively correspond to the sides 16c and 16d of the light guiding prism 16 according to the second embodiment are surfaces that are arranged on opposite sides of the plane that includes the optical axis 36a and that is perpendicular to the plane including the optical axes 36a and 36b. An intersection line of each of these curved surfaces and the plane including the optical axes 36a and 36b has a negative inclination angle (−α2) to the optical axis 36a in the positive direction of the optical axis 36a.

A cross section 31a of the ocular optical system 31 is a cross section corresponding to the plane that includes the optical axis 36a and that is perpendicular to the plane including the optical axes 36a and 36b A cross section 31b of the ocular optical system 31 is a cross section corresponding to the plane that includes the optical axis 36b and that is perpendicular to the plane including the optical axes 36a and 36b. Cross sections 31c, 31d, and 31e of the ocular optical system 31 are cross sections corresponding to a plane perpendicular to the optical axis 36a in the elliptic cylindrical portion 33b of the light guiding prism 33, respectively at a position on the side of the display element 32, at a position in which the four light blocking grooves 33c, 33d, 33e, and 33f are provided, and at a position on the side of the reflection surface 33g. A cross section 31f of the ocular optical system 31 is a cross section corresponding to a plane perpendicular to the optical axis 36a in the portion 33a of the light guiding prism 33.

In the attachable image display device according to the present embodiment, with respect to an intersection line of a cross section corresponding to the plane including the optical axes 36a and 36b and a plane perpendicular to the optical axis 36a (for example, a plane including the cross section 31c) in the light guiding prism 33, a distance from the optical axis 36a to one end (on the side of the emission portion 34) of the intersection (such as d1 in FIG. 32) is greater than a distance from the optical axis 36a to the other end (such as d2 in FIG. 32) due to a positional relationship between the ocular optical system 31 and the display element 32 (for example, d1 >d2 in FIG. 32).

With respect to the four light blocking grooves 33c, 33d, 33e, and 33f, a set of the light blocking grooves 33c and 33d and a set of the light blocking grooves 33e and 33f are provided symmetrically about the plane including the optical axes 36a and 36b. A set of the light blocking grooves 33c and 33e and a set of the light blocking grooves 33d and 33f are provided asymmetrically about a plane including a central axis of the elliptic cylindrical portion 33b and that is perpendicular to the plane including the optical axes 36a and 36b.

For example, as in the case of the example of FIG. 16, when a beam is emitted from the center of the display area of the display element 32 and passes through each of the cross sections 31a and 31b of the ocular optical system 31, the ocular optical system 31 having the configuration described above makes it possible to divert, from the pupil of the user (a pupil of the eve 37), the beam reflected off the curved surface of the portion 33a of the light guiding prism 33 which corresponds to the side 16a of the light guiding prism 16 according to the second embodiment (or the curved surface of the portion 33a of the light guiding prism 33 which corresponds to the side 16b of the light guiding prism 16 according to the second embodiment) before it is reflected off the reflection surface 33g. In other words, it is possible to prevent a ghost image from occurring due to a beam being reflected off the curved surface corresponding to the side 16a (or the side 16b) before it is reflected off the reflection surface 33g.

Further, using the four light blocking grooves 33c, 33d, 33e, and 33f, it is also possible to prevent a ghost image from occurring due to a beam being emitted from the center of the display area of the display element 32 and being reflected off a curved surface that is a side of the elliptic cylindrical portion 33b.

The display element according to each of the embodiments described above is, for example, a liquid crystal display or an organic EL (electro luminescence) display.

The attachable image display device according to each of the embodiments described above is not limited to the example of an attachment illustrated in FIG. 5, and it may be worn on a user such that, for example, the longitudinal direction of the light guiding prism is substantially parallel to the direction of the midline of the user.

In each of the embodiments described above, the light guiding prism is configured to have one reflection surface, but it may be configured to further have one or more reflection surfaces situated closer to an upstream side of a light path than the one reflection surface.

In the light guiding prism 16 according to the first embodiment, a portion of the intersection line of the side 16a and the cross section 16f and a portion of the intersection line of the side 16b and the cross section 16f may each be configured to have a negative inclination angle to the optical axis 18a in the direction of the positive direction of the optical axis 18a.

In the light guiding prism 16 according to the second embodiment, the portion of the intersection line of the side 16a and the cross section 16f and the portion of the intersection line of the side 16b and the cross section 16f may each be configured to have a negative inclination angle to the optical axis 18a in the direction of the positive direction of the optical axis 18a, and a portion of the intersection line of the side 16a and the cross section 16h and a portion of the intersection line of the side 16b and the cross section 16h may each be configured to have a positive inclination angle to the optical axis 18b in the direction of the positive direction of the optical axis 18b.

In the light guiding prism 23 according to the third and fourth embodiments, a portion of the intersection line of the side 23a and the cross section 23l and a portion of the intersection line of the side 23b and the cross section 23l may each be configured to have a negative inclination angle to the optical axis 25a in the direction of the positive direction of the optical axis 25a, and a portion of the intersection line of the side 23a and the cross section 23n and a portion of the intersection line of the side 23b and the cross section 23n may each be configured to have a positive inclination angle to the optical axis 25b in the direction of the positive direction of the optical axis 25b. Further, a portion of the intersection line of the side 23c and the cross section 23l and a portion of the intersection line of the side 23d and the cross section 23l may each be configured to have a negative inclination angle to the optical axis 25a in the direction of the positive direction of the optical axis 25a.

In the portion 33a of the light guiding prism 33 according to the fifth embodiment, a portion of the intersection line of the curved surface corresponding to each of the sides 16a and 16b of the light guiding prism 16 according to the second embodiment, and the plane that includes the optical axis 36a and that is perpendicular to the plane including the optical axes 36a and 36b may be configured to have a negative inclination angle to the optical axis 36a in the positive direction of the optical axis 36a, and a portion of the intersection line of each of these curved surfaces and the plane that includes the optical axis 36b and that is perpendicular to the plane including the optical axes 36a and 36b may be configured to have a positive inclination angle to the optical axis 36b in the positive direction of the optical axis 36b. Further, a portion of the intersection line of the curved surface corresponding to each of the sides 16c and 16d of the light guiding prism 16 according to the second embodiment and the plane including the optical axes 36a and 36b may be configured to have a negative inclination angle to the optical axis 36a in the positive direction of the optical axis 36a.

The present disclosure is not limited to the embodiments described above and may be embodied by modifying the constituent elements without departing from the spirit and scope of the disclosure. Various embodiments of the present disclosure may be formed with any appropriate combination of a plurality of constituent elements disclosed in the embodiments described above. For example, some constituent elements may be deleted in all of the constituent elements disclosed in the embodiments described above. Further, the constituent elements described in different embodiments may be combined arbitrarily.

According to embodiments of the present disclosure, an advantage is provided such that a ghost image generated due to light reflected off a side of a light guiding prism can be prevented in an attachable image display device that includes the light guiding prism or in an ocular optical system that includes the light guiding prism.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

While the invention has been described in terms of several embodiments, those of skill in the art will recognize that the invention is not limited to the embodiments described, but can be practiced with modification and alteration within the spirit and scope of the appended claims. The description is thus to be regarded as illustrative instead of limiting.

In the appended claims, use of the phrase "means for" is intentionally used to invoke the "means-plus-function" language codified historically in 35 U.S.C. 112 § paragraph 6 (pre AIA) and now presently codified in 35 U.S.C. § 112(f). If the phrase "means for" is not found in a claim of the appended claims then it is intentionally absent from that claim and that claim should not be interpreted under 35 U.S.C. § 112(f).

What is claimed is:

1. An attachable image display device, to reduce ghost images presented to a user, comprising:
a display element;
an ocular optical system, wherein the ocular optical system further comprising:
a light guiding prism, the light guiding prism to guide image light from the display element; and
an emission portion, the emission portion has an emission surface and a positive refractive power, the emission portion to emit the image light guided by the light guiding prism; and a reflection surface, the reflection surface to reflect image light to the emission portion, the light guiding prism further comprising:

a first plane containing a first optical axis and a second optical axis, wherein the first optical axis is a portion of the image light before the image light is reflected off the reflection surface, and the second optical axis is a portion of the image light after the image light is reflected off the reflection surface; and a pair of opposing sides, each side of the pair is disposed on an opposite side of the first plane and each side has a negative inclination angle with the first optical axis in a positive direction of the first optical axis and each side has a positive inclination angle with the second optical axis in a positive direction of the second optical axis, each side is triangular in shape and is disposed between the reflection surface and the emission portion, such that in operation beams of light emitted from the display element reflect off of at least one side and are diverted from the user's pupil before the beams reach the reflection surface.

2. The attachable image display device according to claim 1, wherein an absolute value of the negative inclination angle is greater than D/(48n) radians, where D is an opening size of the emission surface in a vertical direction with respect to the first plane and n is a refractive index of the light guiding prism.

3. The attachable image display device according to claim 1, wherein an absolute value of the positive inclination angle is greater than d/L radians, where d is a distance from an intersection point of the first optical axis and the second optical axis to one of the sides of the pair in a vertical direction with respect to the first plane, and L is a position of a virtual image of a display surface of the display element as viewed from the intersection point.

4. The attachable image display device according to claim 1, further comprising:

a housing, the housing holds the ocular optical system; and four sides arranged closer to an upstream side of a light path than the pair, the four sides are a second side, a third side, a fourth side, and a fifth side, wherein the second side and the third side are arranged on opposite sides of the first plane, the second side and the third side are substantially parallel to the first plane, the fourth side and the fifth side are arranged on opposite sides of the first optical axis and, the fourth and fifth sides are substantially perpendicular to the second and third sides, and the housing holds the ocular optical system using all of or a portion of the second side, the third side, the fourth side, and the fifth side.

5. The attachable image display device according to claim 1, further comprising:

a housing, the housing holds the ocular optical system;

a second side and a third side, the second side and the third side are closer to an upstream side of a light path than the pair, the second side and the third side are substantially in a user's vision, and at least a portion of the second side and the third side are polished and exposed from the housing.

6. An attachable image display device, to reduce at least one of ghost images and glare presented to a user, comprising:

a display element;

an ocular optical system, wherein the ocular optical system further comprising:

a light guiding prism, the light guiding prism to guide image light from the display element; and an emission portion, the emission portion has an emission surface and a positive refractive power, the emission portion to emit the image light guided by the light guiding prism; and a reflection surface, the reflection surface to reflect image light to the emission portion, the light guiding prism further comprising:

a first plane containing a first optical axis and a second optical axis, wherein the first optical axis is a portion of the image light before the image light is reflected off the reflection surface, and the second optical axis is a portion of the image light after the image light is reflected off the reflection surface;

a first pair of opposing sides, each side of the first pair is disposed on an opposite side of the first plane and each side of the first pair has a negative inclination angle with the first optical axis in a positive direction of the first optical axis and each side of the first pair has a zero-inclination angle with the second optical axis in a positive direction of the second optical axis; and a second pair of opposing sides, each side of the second pair is disposed on opposite sides of the first plane in a location downstream of the first pair and each side of the second pair has the negative inclination angle with the first optical axis in the positive direction of the first optical axis and each side of the second pair has a positive inclination angle with the second optical axis in a positive direction of the second optical axis, each side of the second pair is triangular in shape and is disposed between the reflection surface and the emission surface, each side of the first pair is connected to each side of the second pair at one common apex point thereby forming a triangular region therebetween, such that in operation beams of light emitted from the display element reflect off of at least one side and are diverted from the user's pupil before the beams reach the reflection surface and ambient light entering the light guiding prism reflects off of at least one side of the first pair and does not substantially enter the user's pupil.

7. The attachable image display device according to claim 6, wherein an absolute value of the positive inclination angle is greater than d/(2L) radians, where d is a distance from an intersection point of the first optical axis and the second optical axis to one of the sides of the second pair in a vertical direction with respect to the first plane, and L is a position of a virtual image of a display surface of the display element as viewed from the intersection point.

8. The attachable image display device according to claim 7, wherein an absolute value of the negative inclination angle is greater than D/(48n) radians, where D is an opening size of the emission surface in a vertical direction with respect to the first plane and n is a refractive index of the light guiding prism.

* * * * *